(12) United States Patent
Vendrow et al.

(10) Patent No.: US 9,473,873 B2
(45) Date of Patent: *Oct. 18, 2016

(54) INSTANT ACTIVATION AND PROVISIONING FOR TELECOMMUNICATION SERVICES ON A MOBILE DEVICE

(71) Applicant: RingCentral, Inc., San Mateo, CA (US)

(72) Inventors: Vlad Vendrow, Redwood Shores, CA (US); Praful Shah, Los Altos Hills, CA (US); Vladimir Shmunis, South Lake Tahoe, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,744

(22) Filed: Sep. 12, 2014

(65) Prior Publication Data

US 2014/0378117 A1 Dec. 25, 2014

Related U.S. Application Data

(63) Continuation of application No. 12/423,723, filed on Apr. 14, 2009, now Pat. No. 8,862,180.

(60) Provisional application No. 61/107,648, filed on Oct. 22, 2008.

(51) Int. Cl.
  H04M 1/00 (2006.01)
  H04W 4/00 (2009.01)
  (Continued)

(52) U.S. Cl.
  CPC ......... *H04W 4/001* (2013.01); *H04M 1/72563* (2013.01); *H04M 3/4234* (2013.01);
  (Continued)

(58) Field of Classification Search
  CPC . H04W 84/105; H04W 84/14; H04W 84/16; H04W 84/18; H04W 88/16; H04W 92/02; H04W 92/24

USPC ...... 455/414.1, 418, 419, 420, 426.1, 426.2, 455/554.1, 554.2, 555

See application file for complete search history.

(56) References Cited

U.S. PATENT DOCUMENTS

| 5,799,065 A | 8/1998 | Junqua et al. |
| 5,889,845 A | 3/1999 | Staples et al. |

(Continued)

FOREIGN PATENT DOCUMENTS

| EP | 0 954 193 | 11/1999 |
| KR | 10-2004-0039569 | 5/2004 |

(Continued)

OTHER PUBLICATIONS

Authorized officer Bo Hyung Lee, International Search Report and Written Opinion in Application No. PCT/US2009/051751, mailed Mar. 5, 2010, 12 pages.

(Continued)

*Primary Examiner* — Jean Gelin
(74) *Attorney, Agent, or Firm* — Fish & Richardson P.C.

(57) ABSTRACT

Methods and systems for instant activation of virtual PBX services on a mobile device are disclosed. In one aspect, a user request for activating virtual PBX services is received on a mobile device. An available primary identification number for the virtual PBX services is retrieved from a telecommunication service provider (TSP). A user interface is presented on the mobile device including a first interface portion presenting the available primary identification number and a second interface portion configured to receive a user identifier. Upon receiving the user input specifying the user identifier and while the user interface is still presented on the mobile device, a user instruction for activating the virtual PBX services is received. Upon receiving the user instruction, the user identifier is sent to the TSP. Then, a confirmation is received from the TSP.

18 Claims, 23 Drawing Sheets

(51) Int. Cl.
*H04M 3/42* (2006.01)
*H04W 84/10* (2009.01)
*H04W 84/16* (2009.01)
*H04M 1/725* (2006.01)

(52) U.S. Cl.
CPC ..... *H04M3/42153* (2013.01); *H04M 1/72552* (2013.01); *H04M 2250/66* (2013.01); *H04W 84/105* (2013.01); *H04W 84/16* (2013.01)

(56) References Cited

U.S. PATENT DOCUMENTS

| | | | |
|---|---|---|---|
| 6,230,024 | B1 | 5/2001 | Wang et al. |
| 6,377,950 | B1 | 4/2002 | Peters et al. |
| 6,542,475 | B1 | 4/2003 | Bala et al. |
| 6,760,324 | B1 | 7/2004 | Scott et al. |
| 6,816,483 | B1 | 11/2004 | Beckstrom et al. |
| 6,870,910 | B1 | 3/2005 | Armstrong et al. |
| 6,950,507 | B1 | 9/2005 | Kaplan |
| 6,993,360 | B2 | 1/2006 | Plahte et al. |
| 7,123,608 | B1 | 10/2006 | Scott et al. |
| 7,162,020 | B1 | 1/2007 | Forte |
| 7,180,638 | B1 | 2/2007 | Hou et al. |
| 7,274,684 | B2 | 9/2007 | Young et al. |
| 7,298,833 | B2 | 11/2007 | Klein et al. |
| 7,369,648 | B1 | 5/2008 | Chang |
| 7,426,218 | B1 | 9/2008 | Archer et al. |
| 7,457,279 | B1 | 11/2008 | Scott et al. |
| 7,996,036 | B1 | 8/2011 | Chen et al. |
| 8,020,486 | B2 | 9/2011 | Yamamoto et al. |
| 8,862,180 | B2* | 10/2014 | Vendrow ........... H04M 1/72563 455/411 |
| 2002/0080025 | A1 | 6/2002 | Beattie |
| 2002/0085701 | A1 | 7/2002 | Parsons et al. |
| 2003/0081565 | A1* | 5/2003 | McIntosh ............... H04W 92/02 370/328 |
| 2004/0128139 | A1* | 7/2004 | Ilan ..................... H04M 3/4938 704/275 |
| 2005/0117733 | A1 | 6/2005 | Widger et al. |
| 2006/0018454 | A1 | 1/2006 | Nonaka et al. |
| 2006/0160566 | A1 | 7/2006 | Plahte et al. |
| 2007/0266077 | A1 | 11/2007 | Wengrovitz |
| 2008/0144804 | A1 | 6/2008 | Mergen |
| 2009/0296907 | A1 | 12/2009 | Vendrow et al. |
| 2010/0099390 | A1 | 4/2010 | Vendrow et al. |

FOREIGN PATENT DOCUMENTS

| | | |
|---|---|---|
| KR | 10-2005-0000884 | 1/2005 |
| KR | 10-2006-0018155 | 2/2006 |

OTHER PUBLICATIONS

Authorized officer Gijsbertus Beijer, International Preliminary Report on Patentability in Application No. PCT/US2009/051751, mailed May 5, 2011, 7 pages.

Authorized officer Blaine R Copenheaver, International Search Report and Written Opinion in PCT/US2009/045703, mailed Jul. 29, 2009, 2 pages.

* cited by examiner

Your Customers Call One Number ⸺ 310d

◉ [ 1 (866) 555-4321 ] ⸺ 311d

○ [ (Select a different number) ▼ ] ⸺ 312d

[ (Enter Your-Company Name) ] ⸺ 313d

Auto-Receptionist:

"Thank you for calling <Your-Company-Name>. If you know the extension of the party you are calling, please enter it now. Press 1 for Sales, Press 2 for John, Press 3 for Fax..."

Answer calls to 1 (866) 555-4321 on your telephone. Please enter at least one telephone number for extension 1 (default extension).

Extension [ 1 ] :

Phone Number [                    ] ⸺ 314d

Additional Phone Number [                    ] ⸺ 315d

Extension [ 2 ] :

Phone Number Or Email Address [                    ] ⸺ 316d

Extension [ 3 ] :

Fax Number or Email Address [                    ] ⸺ 317d

[ Sign Up ] ⸺ 318d

FIG. 3D

Number selector

*400*

📶 📶 1:18 PM 🔋

[Previous] Account Setup [Next]

RingCentral Number
Select the best number for your business (888) 244-5216
(888) 654-9999    >
(888) 654-0088
(888) 222-3322

FIG. 4A

Account info

*410*

📶 📶 1:18 PM 🔋

[Previous] Account Setup [Next]

Login Info
The information below will be used to create your account.
Ring Central Number:  888-654-9999
Your RingCentral number is used for login. Not editable.
Password:
5-10 digits, no repeating or sequential Personal Info First Name:    John
Last Name:    Appleseed
Company Name:    My Company Your RingCentral voicemails will be sent to the address below.

Email:    example@email.com

FIG. 4B

Forwarding Rules

*420*

📶 📶 1:18 PM 🔋

[Previous] Account Setup [Next]

Forwarding Numbers
Enter the numbers you want to ring when callers dial your RingCentral number mobile    (415)-244-5216
business    add business phone
home    add home phone Choose how you want your forwarding numbers to ring.

Simultaneously
Sequentially    >

FIG. 4C

Settings summary
430

1:18 PM

RingCentral

Ring Central Number: (888) 654-9999

Forwarding Numbers

| mobile | (415) 402-4989 | ON |
| work | (415) 377-3769 | ON |
| home | (650) 222-8765 | ON |

Usage
Minutes Remaining: 47

Get More Minutes >

Settings

Summary Favorites Recents RingOut Voicemail

FIG. 4D

RingOut dialpad
450

10:02 AM

Ring Central
J B Consulting: (888) 654-9999

| 1 | 2 ABC | 3 DEF |
| 4 GHI | 5 JKL | 6 MNO |
| 7 PQRS | 8 TUV | 9 WXYZ |
| * | 0 + | # |

446 ↝ Call ⊗

441 Summary 442 Favorites 443 Recents 444 RingOut 445 Voicemail

FIG. 4E

Visual voicemail
460

10:02 AM

Voicemail

| 📞 | Jane Doe 11:25 am (0:33) | 8/8/08 > |
| ▶ | John Appleseed 8:47 am (0:23) | 8/8/08 > |
| 📞 | Mike Lundy 3:40 pm (1:20) | 8/7/08 > |
| 📞 | Barbara Johnes 6:36 pm (0:42) | 8/6/08 > |
| 📞 | (415) 545-4587 11:25 am (0:33) | 8/5/08 > |
|   | (650) 415-1122 | 8/5/08 > |

0:00 ──────●────── -0:23

Call Back        Delete

Summary Favorites Recents RingOut Voicemail

FIG. 4F

500 TOS

To use this application please accept the RingCentral Terms of Service.

[ Decline ]    [ Accept ]

510 Account Setup    [ Next > ]

Select Number
Please select best number for your business.

[ (888) 123-4567    ✓ ]
[ (888) 123-4567      ]
[ (888) 123-4567      ]
[ (888) 123-4567      ]

Extensions
Do you need multiple extensions for employees and/or departments?

[ Yes    ✓ ]
[ No       ]

520 [ < Prev ]    Account Setup    [ Next > ]

Company Information
Company name be read by the auto-receptionist while playing the initial greeting. *"Thank you for calling <company name>..."*

Company Name:    ABC Consulting

Administrator Information
Please provide the account administrator information. All account-related communication will be sent to the email you provide below.

First Name:    John

Last Name:    Appleseed

Email:    enter your email

FIG. 5C

530 — Account Setup

[< Prev]  Account Setup  [Next >]

Company Greeting

Your callers will hear your company greeting before selecting one of the extensions.

- Default ✓
- Custom

[Play]

540 — Account Setup

[< Prev]  Account Setup  [Next >]

Extensions Setup

Two extensions are created by default: your extension (101) and Operator extension (0).

Extension 101

Account administrator information is used to create Extension 101:

| Extension Name: | i.e. Sales |
| First Name: | John |
| Last Name: | Appleseed |
| Email: | jappleseed@yahoo.com |

550 — Account Setup

[< Prev]  Account Setup  [Next >]

Ext. 101 Forwarding Rules

Enter the numbers you want to ring when callers dial your extension 101.

| Mobile: | (415) 123-4567 |
| Phone 1: | enter phone number |
| Phone 2: | enter phone number |

Choose how you want your forwarding numbers to ring.

- Sequentially ✓
- Simultaneously

610 Account Setup

[< Prev] Account Setup [Next >]

Ext. 0: Operator

Your account needs the default extension 0.

| Voicemail Only | Use Admin Settings | Manual Setup |

This extension will only receive voicemail messages. No live operator assigned.

FIG. 6B

620 Account Setup

[< Prev] Account Setup [Next >]

Ext. 0: Operator

Your account needs the default extension 0.

| Voicemail Only | Use Admin Settings | Manual Setup |

You will be assigned as an operator for extension 0. Your extension's settings will be used.

First Name: John
Last Name: Appleseed
Phone Number: (415) 123-4567
Phone Label: mobile
Email: jappleseed@yahoo.com

FIG. 6C

630 Account Setup

[< Prev] Account Setup [Next >]

Ext. 0: Operator

Your account needs the default extension 0.

| Voicemail Only | Use Admin Settings | Manual Setup |

This allows you to manually assign the user to the operator extension.

[Add from Contacts]

First Name: Jane
Last Name: Doe
Phone Number: 408-333-4444
Phone Label: mobile
Email: janed@yahoo.com Variations of the same screen

660

| Cancel | Add Extension | Save |

Add Extension: Ext. 102

Add from Contacts

Extension Name: i.e.Sales

First Name: Jane

Last Name: Doe

Phone Number: 408-333-4444

Phone Label: mobile

Email: janed@yahoo.com

| < Prev | Account Setup | Done |

Extensions
You can add more extensions or edit existing extensions.

Extension 0: Operator >

Extension 101: John Appleseed >

Add New Extension >

| < Prev | Account Setup | Next > |

Ext. 0 Voicemail Greeting
This is the greeting your callers will hear if operator extension doesn't answer the call.

Default ✓

Custom

[ Play ]

Setup Complete

- Your account is now ACTIVE
- Your RingCentral Number: (888) 123-4567
- Your Extension: Sales (101)
- Forwarding rules for your extension are ON.
- Additional Extensions:
  - Operator (0)
  - Support (102)
  - Operations (103)

SMS notifications will be sent to the users assigned to those extensions and they will be able to setup forwarding rules and voicemail greetings for their extensions.
- Auto-receptionist is ON.
- Dial-by-name Directory is ON.

Launch RingCentral

| Cancel | Edit Extension | Save |

Add Extension: Ext. 102

Add from Contacts

| Extension Name: | i.e.Sales |
| First Name: | Jane |
| Last Name: | Doe |
| Phone Number | 408-333-4444 |
| Phone Label: | mobile |
| Email: | janed@yahoo.com |

Delete Extension

Extension 101 — Cancel | Save

Forwarding Numbers:
- mobile: 415-123-4455 — ON
- phone 1: 415-888-7777 — ON
- phone 2: 415-665-9876 — ON Edit Forwarding Rule >

Greetings:
- Introductory Greeting >
- Voicemail Greeting >

FIG. 7E

Edit Extension: Ext. 102 — Cancel | Save

Add Extension:
Add from Contacts

- First Name: Jane
- Last Name: Doe
- Phone Number: 408-333-4444
- Phone Label: mobile
- Email: janed@yahoo.com

Delete Extension

FIG. 7F

Extension 0 — Cancel | Save

Voicemail Only | Use Admin Settings | Manual Setup

User Info:
Add from Contacts

- First Name: Jane
- Last Name: Doe
- Email: janed@yahoo.com
- Phone Number: 408-333-4444
- Phone Label: mobile Single-Line Setup Multi-Extension Setup

INSTANT ACTIVATION AND PROVISIONING FOR TELECOMMUNICATION SERVICES ON A MOBILE DEVICE

CROSS-REFERENCE TO RELATED APPLICATIONS

This is a continuation of U.S. application Ser. No. 12/423,723, filed Apr. 14, 2009, which claims priority to U.S. Provisional Application No. 61/107,648, filed on Oct. 22, 2008. The disclosures of the prior applications are considered part of and are incorporated by reference in the disclosure of this application.

BACKGROUND

The subject matter of the specification relates to telecommunications services.

A private branch exchange (PBX) is a telephone exchange that serves a particular organization. PBXs make connections among the internal telephones of the particular organization—usually a business—and also connect them to the public switched telephone network (PSTN) via trunk lines. Because a PBX incorporates telephones, fax machines, modems, and more, the general term "extension" is often used to refer to any end point on the branch.

With the rapid development of various data networks, for example, packet switching networks, PBX services can now be carried out over these various data networks. Traditional PBX services had previously been difficult to arrange for smaller organizations. Hosted PBX services are developed to serve these smaller organizations. In a hosted setup, the PBX is located at and managed by a service provider, and features and calls are delivered via various data networks (e.g., the Internet and PSTN). The customers just sign up for a service, rather than buying and maintaining expensive PBX hardware.

SUMMARY

The subject matter of this disclosure relates to instant activation of virtual PBX services for a user on a mobile device. The entire process of setup, activation, and configuration of a PBX for an organization can be accomplished in a short time with a single click on a mobile device or in one sitting. The need for going through multiple stages of the activation process is eliminated. The setup, activation, configuration, operation, and management of the PBX can be accomplished using a mobile device over one or more data networks. In some implementations, a user can setup and instantly activate a subset of virtual PBX services with a single click on a single user interface on a mobile device. In some implementations, a user can setup and instantly activate a single line, single extension virtual PBX service on a mobile device. In some implementations, a user can setup and instantly activate a single line, multi-extension virtual PBX service on a mobile device.

In one aspect, in a method for instant activation of virtual PBX services on a mobile device, a user request for activating a subset of virtual PBX services is first received on a mobile device. An available primary identification number for the subset of virtual PBX services is retrieved from a telecommunication service provider (TSP). A user interface is presented on the mobile device. The user interface has one or more of the following interface portions: a first interface portion presenting the available primary identification number and a second interface portion configured to receive a user identifier. User input specifying the user identifier is received from the second interface portion. While the user interface is still presented on the mobile device, a user instruction for activating the subset of virtual PBX services is received. Upon receiving the user instruction, the user identifier is sent to the TSP. Then, a confirmation is received from the TSP indicating that the subset of virtual PBX services has been successfully activated.

In some implementations, the user identifier is a telephone number, the set of telecommunication services includes an operator extension, and the telephone number is mapped to the operator extension. In some implementations, the confirmation is a call to the telephone number. In some implementations, the user identifier is an email address, the subset of virtual PBX services includes an operator extension, and the user interface has a third interface portion configured to receive a telephone number for the operator extension. In some implementations, the confirmation is an email to the email address. In some implementations, the user interface further includes a third portion configured to receive one or more configuration parameters for the subset of virtual PBX services. The one or more configuration parameters specify additional extensions for the subset of virtual PBX services, an auto-receptionist greeting, voice mail rules, or call forwarding rules for the subset of virtual PBX services. In some implementations, a list of available primary identification numbers is retrieved and presented in the first interface portion, and the user input selects a primary identification number from the list of available primary identification numbers.

In one aspect, in the method for instant activation of virtual PBX services on a mobile device, a user request for activating a subset of virtual PBX services is first received on a mobile device. An available primary identification number for the subset of virtual PBX services is retrieved from a telecommunication service provider (TSP). One or more user interfaces are presented on the mobile device for receiving user inputs. The user inputs include the available primary identification number and a telephone number for an operator extension of the primary identification number. The user inputs are received from the one or more user interfaces. Upon receipt of the user inputs, an activation instruction is received from the user. Upon receipt of the activation instruction, the user inputs are sent to the TSP to associate a previously-provisioned placeholder virtual PBX services account with the user. After the user inputs are sent, a confirmation is received from the TSP indicating that the subset of virtual PBX services has been successfully activated.

In some implementations, the user inputs further include configuration parameters for the subset of virtual PBX services, and the configuration parameters specifies additional extensions for the subset of virtual PBX services, an auto-receptionist greeting, voice mail rules, or call forwarding rules for the subset of virtual PBX services. In some implementations, the user inputs include configuration parameters for the subset of virtual PBX services, and the configuration parameters specify at least one additional extension for the subset of virtual PBX services, and voice mail rules or call forwarding rules for the operator extension and the additional extension. In some implementations, the user inputs include configuration parameters for the subset of virtual PBX services, and the configuration parameters specify at least one additional extension for the subset of virtual PBX services, and an extension identifier for the at least one additional extension. In some implementations, the extension identifier is a telephone number for the additional extension. In some implementations, the extension identifier is an email address for notifying the owner of the additional extension about the successful activation of the virtual PBX services and the additional extension.

In one aspect, in a method for instant activation of a subset of virtual PBX services on a mobile device, a placeholder virtual PBX service account is provisioned. A default subset of virtual PBX services is configured for the placeholder virtual PBX service account. An available primary identification number to be associated with the placeholder virtual service account is obtained. After the provisioning, configuring, and obtaining, the available primary identification number is sent to a mobile device upon request from the mobile device. Data is received from the mobile device representing a request to activate the subset of virtual PBX services. The data include a user identifier. The received data are associated with the placeholder virtual PBX service account to activate the virtual PBX service account. A confirmation is sent to the mobile device indicating that the subset of virtual PBX services has been successfully activated.

In some implementations, the user identifier is a telephone number for an operator extension of the subset of virtual PBX services. In some implementations, the data further includes configuration parameters for the subset of virtual PBX services and the configuration parameters specify additional extensions for the subset of virtual PBX services, an auto-receptionist greeting, voice mail rules, or call forwarding rules for the subset of virtual PBX services. In some implementations, the data further includes configuration parameters for the subset of virtual PBX services, and the configuration parameters specify at least one additional extension for the subset of virtual PBX services, and voice mail rules or call forwarding rules for the operator extension and the additional extension. In some implementations, the data further includes configuration parameters for the subset of virtual PBX services, and the configuration parameters specify at least one additional extension for the subset of virtual PBX services, and an extension identifier for the at least one additional extension, where the extension identifier is either a telephone number or an email address. In some implementations, owner of the additional extension is notified about the activation of the virtual PBX service account and the additional extension using the extension identifier. In some implementations, configuration data is received for the additional extension from a second mobile device.

Other aspects and implementations are disclosed which are directed to systems, methods and computer-readable media.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIGS. 3A-3D show example user interfaces for activating a subset of virtual PBX services with a single click.

FIGS. 4A-4F show a set of example user interfaces for some telecommunications functionalities available on a mobile device.

FIGS. 5A-5H show a set of example user interfaces for setting up and activating a single-line virtual PBX service on a mobile device.

FIGS. 6A-6H show a set of example user interfaces for setting up and activating a multi-extension virtual PBX service on a mobile device.

FIGS. 7A-7F show a set of example user interfaces for setting up extensions of a multi-extension virtual PBX service on a mobile device.

Like reference symbols in the various drawings indicate like elements.

DETAILED DESCRIPTION

Conventional Multi-Stage Activation Process

Conventional techniques for activating telecommunications services typically require users to go through a multi-stage process. Even for a user who is evaluating a telecommunications service, the user is typically required to experience a multi-stage process and delays between stages before being able to evaluate a telecommunications service to decide whether to use the telecommunications service. For example, a user is typically asked, in one stage, to provide contact information (e.g., name, address, or other contact information). In another stage, a user is typically asked to provide billing information (e.g., a credit card number). After contact and billing information has been provided, if required, activating a telecommunications service is itself a multiple stage process.

Figure 1:
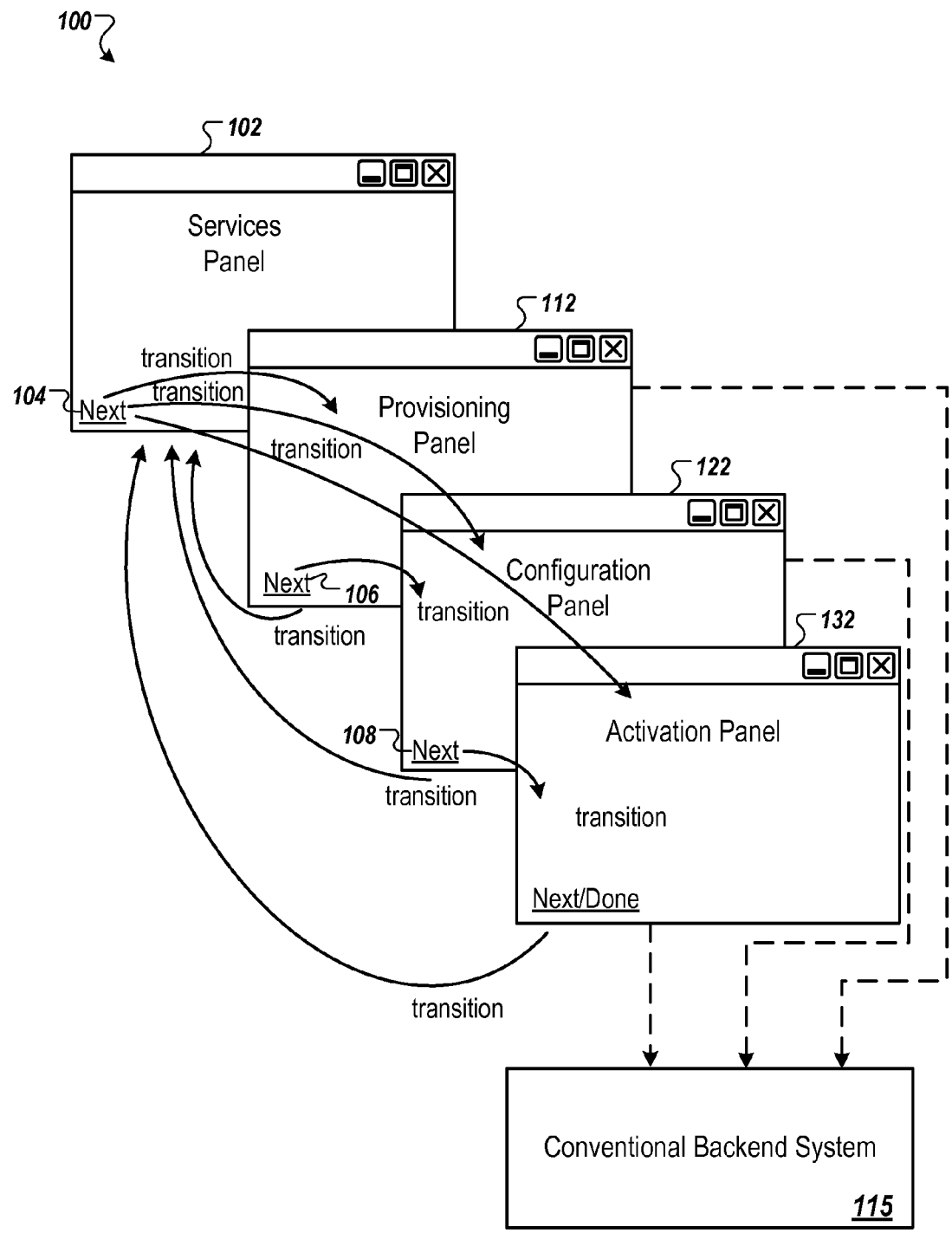
FIG. 1 shows example user interfaces for a multi-stage activation of a virtual PBX service.

FIG. 1 depicts a set of user interfaces 100 typically used in traditional telecommunications service activation techniques. In a typical telecommunications service activation process, a window 102 is presented to a user in response to a request to activate a telecommunications service. Window 102 includes an activation option ("Next") 104, which can be a link. Window 102 transitions to window 112 when the user selects activation option 104. The user then is presented with window ("Provisioning Panel") 112 to provide data to a conventional backend system 115 to provision a telecommunications service, such as a hosted or virtual PBX. After the provisioning is completed at the backend system 115, the user typically experiences a transition back to window 102 if the user desires to review information regarding the telecommunication service. In some conventional backend systems, due to the delay with respect to the provisioning process at the backend system 115, the user typically experiences a delay before being able to proceed to the next step of an activation process. In some instances, the delay lasts several days and sometimes weeks. The user typically resumes the setup in a different session that resumes with window 102. During this delay the user is not able to use the telecommunication services. After the provisioning is completed, a user can proceed to configure the telecommunications service. A user usually is required to transition to window ("Configuration Panel") 122 to interact with conventional backend system 115 to configure the telecommunications service. Before the completion of the configuration, the user is still not able to use the telecommunication services. After the completion of the configuration, the user typically encounters further delays when the user transitions back to window 102 to review information regarding the selected telecommunications service. The back-and-forth activation process continues between window 102 or 122 and window ("Activation Panel") 132 to activate the telecommunications service. By requiring the user to interact with two or more windows 102, 112, 122, and 132, the multiple-stage, back-and-forth process interrupts the user experience during activation. Thus, a user experiences numerous transitions in the process of procuring telecommunications services. After each stage, there can be loss of potential users due to the cumbersome activation process. Furthermore, the long delays experienced by the users, which are caused by the physical time and space constraints of provisioning, activation and testing, equipment availability, deployment personnel availability, also tend to drive away potential users.

Furthermore, conventional methods of provisioning and activation a telecommunication service typically involve communications over a telephone, over the worldwide web on a computer, or over a courier service or fax machine with paper requests. This also causes inconvenience to the customers or potential customers in procuring telecommunications services on the go when hardware equipment such as a computer or fax machine, or services such as internet connections are not readily available.

Advantages of Mobile Devices as a
Telecommunications Platform

Mobile devices have become an integral part of everyday life for many people. Mobile devices such as Personal Data Assistants (PDAs), mobile phones, media players, and even handheld gaming consoles can provide communications services, such as email, telephone, and instant messaging. Many mobile devices can also provide video and internet capabilities, such as video conferencing, internet browsing, or data transfer and file sharing. Furthermore, mobile devices also store a wealth of personal and communications data, such as personal profile, contacts or address book, and personal calendar. Many mobile devices contain additional hardware or sensors making them aware of their locations, orientation, state of motion, and surrounding environment. The network, multimedia, and personal data retention capabilities as well as portability of mobile devices make them ideal as a new platform for business telecommunications services that had traditionally been occupied by non-mobile PSTN landlines and computers.

Activation, configuration, use, and management of a virtual PBX entirely on a mobile device solve many problems of conventional PBX services. A virtual PBX user is not limited by location and equipment, and can set up, configure, and modify the virtual PBX on the go. In some instances, a small business can instantly activate and provision a business grade multi-extension virtual PBX from a mobile device. Each extension user can also configure and modify the call handling rules for his/her particular extension. When an outside caller calls the virtual PBX main number for the small business, and chooses an extension, the user associated with that extension can be reached on his own mobile devices, home telephone, or office phone according to his own call handling rules.

Mobile devices with various network capabilities and graphical user interfaces allow various virtual PBX functions to be performed over multiple networks to save cost and/or maintain uninterrupted connectivity and call quality.

In some implementations, a user is presented with a single user interface for account setup and activation where a user can set up a virtual PBX service including a main number, call forwarding, voicemail, and/or auto-receptionist service with a single click on a single user interface. In some implementations, a user is able to set up a business class virtual PBX service including call routing, a single extension, multiple extensions, auto-receptionist service, with a single click on a mobile device after providing a minimum set of information through a small number of interface screens in one sitting. In some implementations, a user is also able to configure and modify multiple extensions and the virtual PBX from a mobile device.

To facilitate discussion, examples are set forth in the context of a mobile device having a touch sensitive screen for receiving user input, such as an iPhone® made by Apple, Inc. However, the same principles apply to other mobile devices. The examples should not be construed to limit the claims in these respects.

User Interfaces for Activating Telecommunications
Services

A. Setting Up and Activating a Free/Evaluation Account

Figure 2:
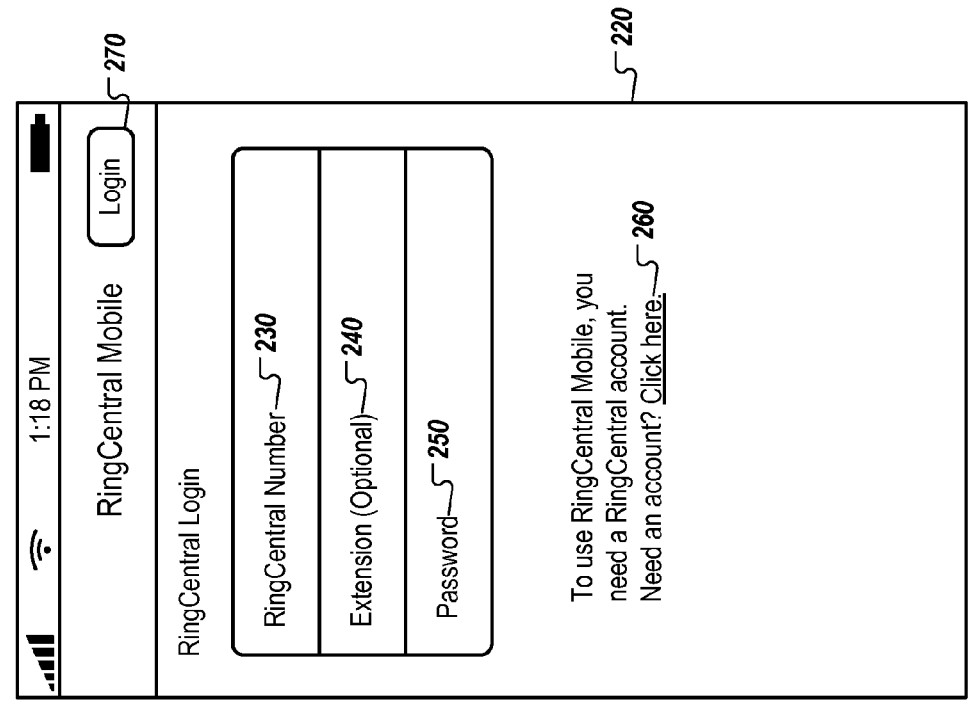
FIGS. 2A-2B show example user interfaces for activating a virtual PBX service on a mobile device.
Figure 2:
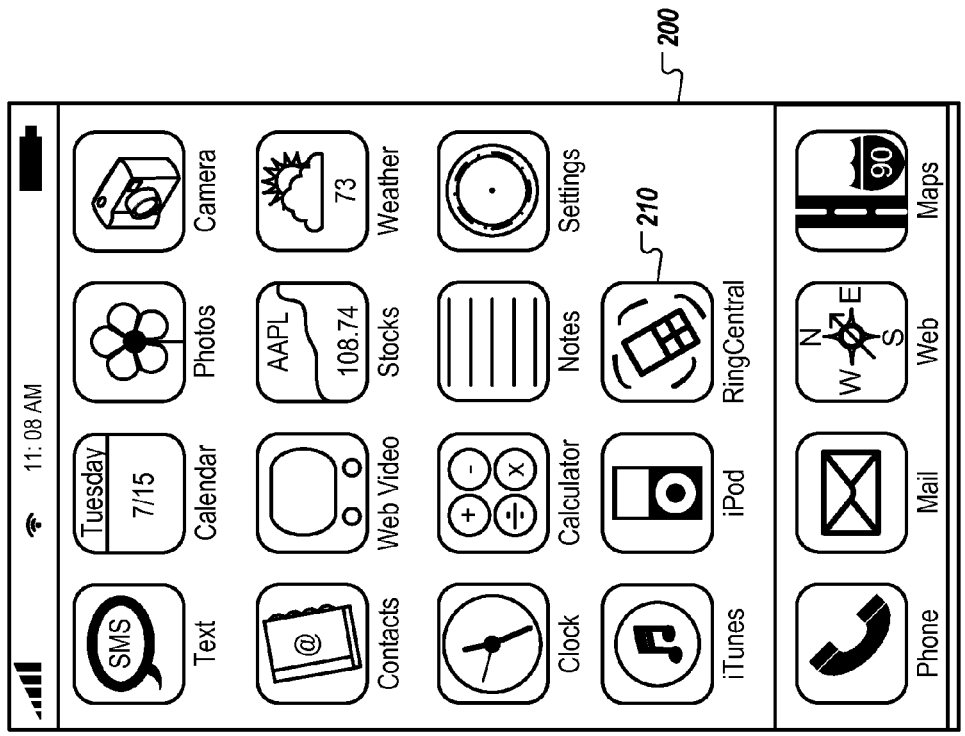

In FIG. 2A, an example implementation of the virtual PBX service activation and configuration functionality is presented to a user as an application available in a mobile device 200 (see the "RingCentral" icon 210). The icon 210 representing the application can be invoked by a user input selecting it with a pointing device or touching it on the touch sensitive screen of the mobile device 200. In some implementations, the application can be configured to run as a default program and is activated whenever the mobile device 200 is first turned on. In some implementations, one or more functions of the application can be implemented as separate modules that each has its respective icon and can be invoked separately. For example, the activation and configuration functions can be implemented as a separate module from the telephone/voicemail module. Once the applicable application icon 210 is invoked, a user interface is usually presented offering a user the option to use or configure an existing virtual PBX service account, or to activate and configure a new virtual PBX service account.

FIG. 2B shows an example user interface 220 for choosing whether to log into an existing virtual PBX account, to setup an extension, or to activate a new virtual PBX account. To log into an existing account, a user needs to enter an identifier (e.g., a RingCentral number as a primary identification number, or a user identification number), and corresponding authentication password in appropriate fields (230 and 250) on the user interface. Optionally, a user can enter an extension number to specifically enter into an account to set up an extension that has been provided in a separate session to set up the main virtual PBX number (i.e., the primary identification number). After completing the identifier and password information in the appropriate fields 240 and 250, the user can proceed to log into the account by clicking on the login button 270 on the user interface 220. In some implementations, the user can set up the application to remember the identifier and password, and automatically populate the requisite fields when the user invokes the application.

In some implementations, the option to create a new account can be presented as a button or a link 260 that invokes a different user interface where a user can enter requisite information to create and activate a new account.

In some implementations, where a free or evaluation account option is offered, the user interface presents three fields of information: (1) an identifier field where a user chooses a primary identification number (or a main telephone number for the virtual PBX service, such as a toll-free number provided by the telecommunications service provider out of a set of available numbers); (2) an authentication field where a user can enter a user identifier, and (3) a forwarding number field where a user can enter one or more phone numbers to forward to when a caller calls the primary identification number. In some implementations, the authentication field can be the same as the forwarding number field.

Figure 3A:
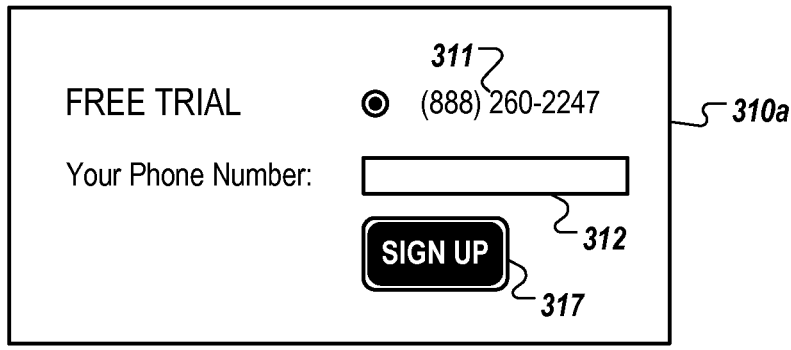

FIG. 3A-3D are example user interfaces that can be used to active a single line trial virtual PBX service with a single submission of requisite data. In FIG. 3A, interface 310*a* includes a telephone number (e.g., a toll-free number 311) used as an identifier to access at least a subset of virtual PBX services. To request activation, a user enters in a field 312 another telephone number, which, for example, can be used as a user identifier. Button 317 can be used to submit data (i.e., telephone numbers 311 and 312) to request activation. In some implementations, the subset of virtual PBX services can be activated for a limited period of time (e.g., 24 hours) for evaluation purposes. To maintain the activated services beyond the limited period, a user can, for example, use another user interface (not shown) to provide additional data, such as billing information.

Figure 3B:
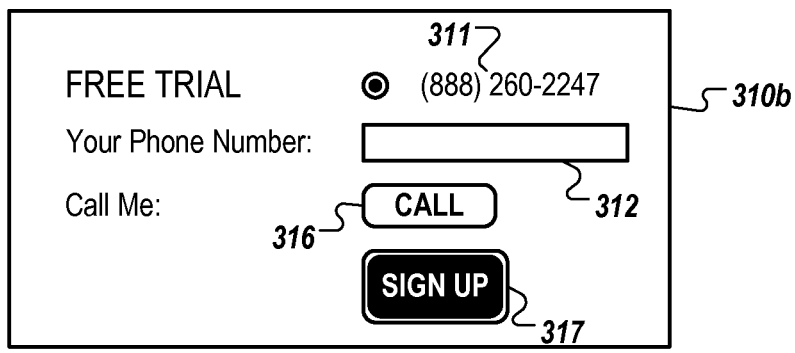

FIG. 3B illustrates another example interface for activating a subset of virtual PBX services. Interface 310*b*, in addition to the elements shown in FIG. 3A, can include a ("CALL") button 316 for initiating a test to confirm activation. For example, button 316 can generate a call (e.g., as a validation call) to a phone number provided in field 312. As another example, after entering a telephone number into field 312, a user can select CALL button 316 to generate a call from the telecommunications service provider (TSP) system associated with number 311 to the telephone number entered into field 312 to optionally check the call path to the telephone number entered into field 312. Button 317 can be used to submit data (i.e., telephone numbers 311 and 312) to request activation.

Figure 3C:
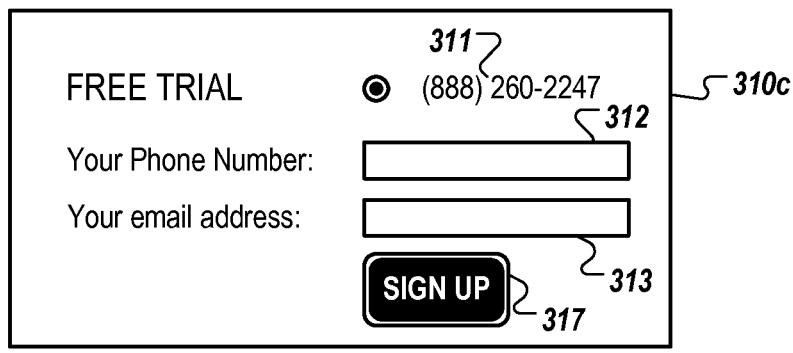

FIG. 3C illustrates another example interface for activating a subset of virtual PBX services. Interface 310*c*, in addition to the elements shown in interface 310*a* (FIG. 3A), shows a field 313 for entering an email address. An email address can be used to provide, for example, voice to email services, facsimile to email services, or other services using email. The email address can also be used to send a confirmation email to the user indicating whether the activation was successful.

FIG. 3D illustrates another example interface for activating a subset of virtual PBX services. Interface 310*d* includes a default identifier 311*d*. If a user desires to use another identifier to access the virtual PBX services, the user can select one using field 312*d*. In some implementations, the virtual PBX services can be provided with an auto-receptionist greeting (i.e., a computer-generated greeting). Thus, field 313*d* allows a user to enter a company name for use in the auto-receptionist greeting. In some implementations, the subset of virtual PBX services can include a set of default configurations for, for example, up to three extensions. For instance, one or more extensions (e.g., extension 1) can be configured with two or more telephone numbers by entering the telephone number in fields 314*d* and 315*d*. If more than one telephone number is entered, configuration data can include one or more rules to select a telephone number for use with extension "1" in different situations. For example, a TSP system can select the number entered in field 315 as an alternate number if the number entered in field 314*d* is in use. To configure extension "2," a user can enter a phone number or email address (e.g., to use voice to email services) in field 316*d*. To configure extension "3," a user can enter a facsimile ("fax") number or email address (e.g., to use fax to email services) in field 317*d*. In some implementations, button 318*d* can be configured to send a single submission of data (i.e., data gathered from one or more of fields 311*d* to 317*d*) to request activation. In some implementations, one of the extensions is designated as an operator extension, or default extension. In a single line, single extension setup, the only extension is the operator extension.

In each of the above example interfaces, the available main phone numbers (or available primary identification numbers) can be presented as a drop down list, or a selectable list or table. In some implementations, each of these available main phone numbers can be associated with a placeholder virtual PBX services account that has already been provisioned and configured with a subset of virtual PBX services.

In some implementations, the user can enter authentication information such as a password for this account. In some implementations, a password can be an email address or telephone number that the user has entered as the user identifier or forwarding number. In some implementations, a field of personal information may also be required. A user can enter information such first name, last name, company name. Alternatively, these fields can be automatically populated by information already stored in the mobile device.

In some implementations, a user can enter one or more forwarding telephone numbers, such as a mobile phone number, a work phone number, or a home phone number. In some implementations, the mobile phone number of the mobile device is automatically populated into the mobile phone number field. The user can choose to fill in the other numbers. In some implementations, the user can also choose to have these forwarding numbers ring simultaneously or sequentially when a caller calls the main number.

All of the information described above can be presented in a single user interface screen. In some implementations, if the screen is not large enough a scrollable interface can be presented, and the user can scroll through the screen to review and enter all the necessary information. Once these required fields for a free or evaluation account is entered, a user can click on an activation button and the new evaluation account is created and activated at the backend virtual PBX server system. The user can start using a set of default telecommunications services immediately.

In some implementations, the required information for account activation and configuration can be preset by the service provider or automatically populated by the application by extracting information stored in the mobile device or other servers serving the mobile device. When all the information is preset or automatically populated, the user is able to activate a preset of automatically configured telecommunications services by a single click.

In some implementations, an extension can refer to a branch from a group of two or more branches associated with a main telephone number for the virtual PBX services. As illustrated in interface 310*d*, the main telephone number can be identifier 311*d* or 312*d*. Three extensions (i.e., branches) are includes in the services configuration shown in FIG. 3D. For example, a caller to a telephone number (e.g., identifier 311*d* or 312*d*) can be directed to select "1" for extension 1 to reach a sales department, select "2" for extension 2 to leave a voice mail (i.e., voice mail recording), or select "3" for extension 3 to connect to a facsimile machine. In some implementations, a user can modify configuration data to add, remove, or change extensions, or any services or features before or after activation of the virtual PBX services.

B. Setting Up and Activating a Single-Line Account

FIGS. 4A-4F are sample user interface screens for configuration and activation of a single-line virtual PBX service. A single-line virtual service provides one main telephone number, and calls made to that number is managed according to a single set of call control rules for a single user. A set of call control rules can include forwarding numbers/rules, voicemail rules, ring-out rules, and other PBX functions etc.

FIG. 4A shows an example primary identification number selection user interface 400. A set of main numbers (i.e., primary identification numbers) are presented to the user in the interface 400. These main numbers are available primary identification numbers at the TSP server backend, and can be activated immediately at the conclusion of the activation process. In some implementations, the main numbers presented are toll-free numbers. In some implementations, the numbers presented are local numbers. In some implementations, a combination of toll-free numbers and local numbers can be presented. In some implementations, a drop down menu of available numbers can be presented when a user touches the first default available number presented on the user interface, and the user can change the default number to a number of his choice. Once a user has selected a main number, a visual indicator such as a checkmark or highlighting of the selected main number can be presented. At the completion of the main number selection, the user can press a button (e.g., the "Next" button on the user interface) to move to the next screen.

FIG. 4B shows an example account information setup screen 410. In this user interface, the number selected during the main number selection stage (FIG. 4A) can be displayed as the primary identification number for the virtual PBX service account to be activated. Authentication information such as a password can be entered for future access of the account. Other information such as personal information, first name, last name, company name can be specified in this interface. Optionally, an email address can also be specified for voicemail messages left at the main number selected.

FIG. 4C shows an example user interface 420 for setting up the forwarding rules for the virtual PBX service. In this user interface, the user can enter one or more forwarding numbers, such as a mobile number, a business number, and a home number. In some implementations, these numbers can be manually entered or automatically populated based on the information stored on the mobile device or a server serving the mobile device (e.g., the mobile number field is automatically populated by extracting the number of the mobile device from the device itself or its wireless telephone server). In some implementations, the information can come from an address book application in the mobile device. In some implementations, a text prompt can be presented for a user to enter the forwarding numbers. In some implementations, the user has the option to select whether the forwarding numbers should ring simultaneously or sequentially when a caller calls the main number. In some implementations, a visual representation of the selection is presented when a user makes a selection by touching one of the options (e.g., "sequentially" is selected as indicated by the checkmark next to it) on a touch-sensitive display of the mobile device.

FIG. 4D shows an example settings summary user interface 430. Once a user has submitted all necessary information for account activation, a settings summary user interface 430 can be presented. In some implementations, the settings summary interface can present the main number for the subset of virtual PBX services, and one or more forwarding numbers. Optionally, if the duration for the services is limited, the amount of time still remaining for use in the account can be presented in the settings summary. Optionally, a link or button can be presented that leads the user to interfaces where additional service time can be obtained (e.g., by purchase). In some implementations, a settings link or button can be presented that when pressed or selected, will lead the user to other interfaces where the settings can be modified.

FIG. 4E also shows various user interface elements that are available for the user in the virtual PBX application. For example, the "Home" button 441 optionally can lead to the presentation of the settings summary interface 430; the "Favorites" button 442 can optionally lead to a "frequently dialed numbers" interface; the "Recents" button 443 can optionally lead to a "recent dialed, received, or missed numbers" interface; the "RingOut" button 444 can optionally lead to a functionality called "RingOut", where a user using the virtual PBX services application can dial an outside telephone number (a number external to the PBX) via the virtual PBX application, and have the call on the callee's end appear to have originated from the main number of the account; and an "Voicemail" button 445 can optionally lead to an interface where an user can access and review the voicemail messages delivered to the account by outside callers calling the main number.

FIG. 4E also shows an example interface 450 for the "RingOut" option. In some implementations, when the "RingOut" option is invoked by a user, such as by pressing on the "RingOut" button 444 shown on the user interface of the virtual PBX application, a dial pad is presented in the user interface 450. A user can enter a telephone number he wishes to reach by pressing the numbers on the dial pad, or by entering the numbers by pressing the hardware keys present on the mobile device. After the number is entered, the user can press a "Call" button on the display or the mobile device to call that number. The virtual PBX server will receive this call via one or more communications networks, and will proceed to call that number entered by the user, and then connect the two calls and generating the appearance that the call originated from the main number of the account. In some implementations, the user can choose to have a different number than the main number of the account appears as the originating number.

In some implementations, the "RingOut" interface can also include a button 446 for invoking an address book application on the mobile device. In some implementations, a user is able to enter a phone number to RingOut directly from the address book by selecting that number. In some implementations, a user is allowed to dial a number presented in a web-browsing application, or other applications on the mobile device by highlighting that number and clicking on a designated button provided by the virtual PBX application.

In some implementations, the RingOut interface also includes a button for the user to cancel the RingOut attempt before the call is made (e.g., the button with a circle and cross on it).

FIG. 4F shows an example interface 460 for a visual voicemail service. Voicemail messages can be delivered to the main number of the virtual PBX service account. When a caller calls the main number and the call was not answered, a voicemail can be left at the server of the virtual PBX services. In some implementations, the voicemails can be downloaded to the mobile device as sound files prior to the user invoking the voicemail on the visual voicemail interface. In some implementations, the voicemails can be transmitted to the mobile device as the user is listening to the voicemail. In some implementations, the availability of voicemail messages in the virtual PBX service account is shown in the visual voicemail interface as a list. Optionally, the voicemails will be shown with the callers' names or numbers, the date and time of the voicemail messages, and optionally, the duration of the voicemail messages. Optionally, the name of the caller will be displayed if the caller's number already exists in the user's address book or if the caller's name is available through other look-up services.

In some implementations, the visual voicemail interface also presents a user interface element showing control options for reviewing the voice mail. In some implementations, when a voicemail is selected, for example, by highlighting it in the list of voicemails, a "Play" button can be displayed next to it, and a visual indicator for the duration of the voice mail can also be shown. When a user selects to play the voicemail, the visual indicator would be updated showing the present location of the playback in the entire timeline of the voicemail. Optionally, a user can rewind or fast forward to a desired location in the voicemail timeline by flicking or swiping across the visual indicator of the voicemail timeline in the backward or forward direction on the touch-sensitive display. In some implementations, the visual indicator of the timeline can be implemented to show absolute time location in the timeline. For example, the length of the visual indicator is directly correlated to the duration of the voicemail. A long voicemail can have a long visual indicator, and a short voicemail can have a short visual indicator. In some implementations, the visual indicator of a long message twice in duration as a short message would be twice as long as the visual indicator for the short message. In these above implementations of the visual indicator, a user can fast forward or rewind by a finger movement on the touch-sensitive display, and an absolute distance of the figure movement would determine the amount time fast forwarded or rewound. In some implementations, the visual indicator shows the relative time location in the timeline, and the speed or amount of fast forwarding and rewinding can depend on the magnitude or speed of the finger gesture on the touch sensitive display.

In some implementations, the voicemail control can include a button for callback. A user can press on the callback button to return a call to the person who has left the voicemail. By calling back, all the functionalities of RingOut can be available and employed.

In some implementations, the voicemail control can include a button for deleting a voicemail. In some implementations, the voicemail control can include a button for forwarding the voicemail to another email address, or another phone number or save it to a different storage location on the mobile device as a sound file.

All the functionalities described above for setting up a single extension telecommunications services can be activated by a single click or in one sitting. In some implementations, the server for the telecommunications services can provision for the account and provide a set of default functionalities prior to receiving the activation request, and once the user sends the activation request by a single click, the set of default functionalities can be made available to the user immediately.

C. Setting Up and Activating a Multi-Extension Account

In addition to setting up and activating a single-line virtual PBX service account on a mobile device. In some implementations, a user can also set up a multi-extension account for virtual PBX services on a mobile device.

FIGS. 5A-5H show an example process for setting up and activating a multi-extension virtual PBX service account on a mobile device.

Optionally, as shown in FIG. 5A, when a user invokes the virtual PBX service application to setup the account, a Terms of Service click-through contract can be presented in the user interface 500. The user has the option to view the Terms of Services contract before proceeding to sign up for an account. If a user chooses to not to accept the terms of services by clicking on the "Decline" button, the application exits and no account is created. If a user chooses to accept the terms of services, then by clicking on the "Accept" button, the user interface for account setup and activation can be presented.

When the account set up and activation interface 510 is presented, the user selects from a set of available main numbers as described previously for the single-line account setup and activation. In addition, the user interface 510 presents an option for setting up multiple extensions for other individuals or departments that a user wishes to associate with the main number (as shown in FIG. 5B). In some implementations, a text prompt explaining this option can be displayed, and an option for choosing to create extensions is presented. When a user chooses to set up an account with extensions and selects the appropriate option on the touch sensitive screen of the mobile device, a visual indicator showing that selection can be presented (e.g., the checkmark next to the option "YES").

FIG. 5C shows an example interface 520 for a step of the account setup, i.e., setting up the company information, and/or Administrator information. Company information can include a company name. The company information can be used to customize an auto-receptionist message that is played when a caller places a call to the main number. For example, the auto-receptionist message can state: "Thank you for calling<Company Name> . . . " The Administrator information can include information of the person who will manage this virtual PBX service account. The Administrator information can include the administrator's name, and contact information such as an email address or a telephone number. All account-related communications can be sent to the Administrator according to the information entered in these fields by the user. In some implementations, the information can be automatically populated by user profile information extracted from the mobile device itself or other servers serving the mobile device.

FIG. 5D shows an example user interface 530 for setting up a company auto-receptionist greeting. A company auto-receptionist greeting can be played to a caller when the caller places a call to the main number of the virtual PBX services. After the greeting, the caller is usually prompted to enter an extension that he wishes the call to be routed to, or to leave a voice mail message, depending on the call control rules set up by the administrator. In some implementations, the user interface 530 presents a default greeting that has been pre-selected or pre-programmed. In some implementations, the greeting can be tailored to a particular type of practice or business. In some implementations, the user interface presents a drop down list of greetings that a user can select as the default greeting. In some implementations, the user can enter a custom greeting by selecting the "custom" greeting option presented on the user interface 530. In some implementations, the user can record a custom greeting. In some implementations, user can enter text for all or portions of the custom greeting, and have the greeting played with the assistance of text-to-speech software. In some implementations, the user interface can have a button for playing or previewing all the greetings available, recorded, or selected before finalizing the selection.

FIG. 5E shows an example user interface for setting up extensions for the virtual PBX services. In some implementations, two extensions can be created by default, one extension for the user setting up the account and one extension for an Operator. In some implementations, only one extension is created, and the extension for the user is the operator extension. In one example, the extension for the user setting up the account can be called extension "101." Optionally, the user is offered an opportunity to set up extension 101 in the user interface 540. In some implementations, setup information of the account administrator can be automatically populated for extension 101. For example, the name of the administrator, and contact information of the administrator can be automatically inserted into the fields for extension 101. In some implementations, these fields are editable, and names and contact information of other users can be entered for extension 101. In some implementations, an extension name field is provided for the user to enter an extension name by which a caller can refer to this extension. For example, the extension name for extension 101 can be "Sales", and when a caller wishes to be transferred to "Sale" after being presented the option, the call is routed to extension 101.

FIG. 5F shows an example user interface 550 for entering the forwarding rules for an extension 101. The forwarding rules can be applied when a caller calls the main number and dials for extension 101. The forwarding rules setup interface is essentially the same as the forwarding rules setup for a single-line account. The user for the extension or the administrator can enter one or more phone numbers to which a call made to the extension 101 can be forwarded. In some implementations, one or more numbers can be automatically populated by the application using information extracted from the mobile device itself, or an address book on the mobile device, or a service provider serving the mobile device. The user can set up whether the multiple forwarding numbers will be rung simultaneously or sequentially in the user interface 550.

Figures 5G, 5H:
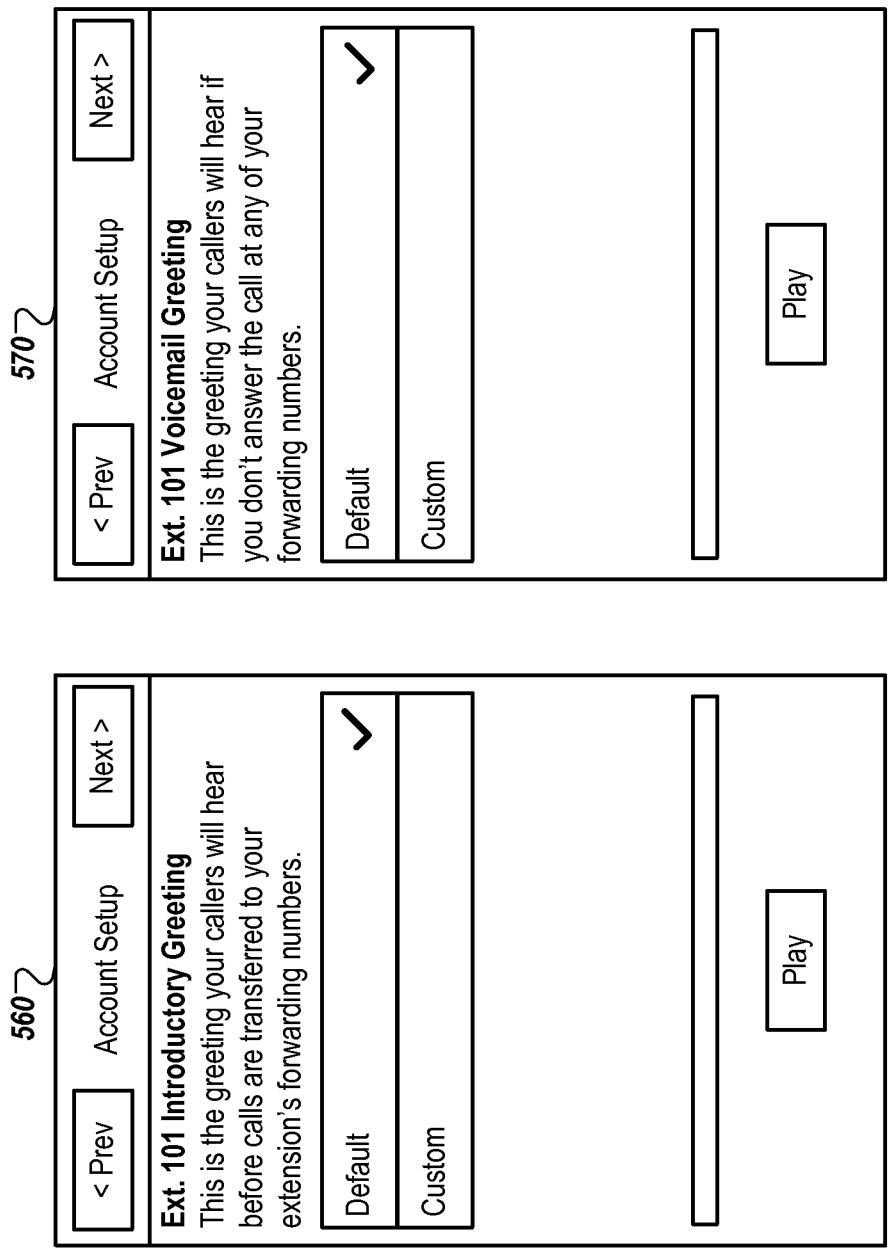

FIG. 5G presents an example setup interface 560 for an introductory greeting for extension 101 similar to that for setting up the auto-receptionist greeting of the main number. The administrator or the user can select from a set of default greetings, or alternatively, enter or record a custom greeting in this user interface. The user interface 560 can similarly display a playback button for previewing the greeting before finalizing the greetings selection. The greeting selected can be played when a call is transferred to the forwarding numbers of the extension 101.

FIG. 5H presents an example setup interface 570 for a voicemail greeting. A voicemail greeting for the extension 101 is played when the user of the extension 101 does not answer the call at any of the forwarding numbers. The voicemail greeting can similarly be selected from a set of default greetings, or can be particularly recorded or entered by the user. The user interface can similarly display a playback button for previewing the greeting before finalizing the greetings selection.

Continuing with the steps of setting up extension 101, the user can proceed to set up the operator extension. FIGS. 6A-6D shows example user interfaces for setting up the Operator extension. The operator extension is the default extension that would be reached if a caller does not specify another extension under the main number.

FIGS. 6A-6C show three alternative interfaces (610, 620, and 630) for setting up the operator extension. FIG. 6A shows the option for setting up an operator extension without a live operator. Under this option, when a call is directed to the operator extension, the caller can only leave a voicemail to the operator extension. FIG. 6B shows the option for setting up the operator extension using the same information as in the Administrator settings. The administrator will be assigned as the operator, and the settings such as forwarding rules, introductory greetings, and voicemail greetings of the Administrator can be used as the default settings for the operator extension. FIG. 6C shows the option to manually setup the operator extension. The operator information can be selected from the user's address book, and automatically populated to the various fields. In some implementations, the various fields can be manually entered. The fields can include information such as the operator's name, phone number, phone label, and email address.

FIG. 6D shows the user interface 640 for setting up a voicemail greeting for the operator extension. The same options for choosing voicemail greetings can be presented as for the other extensions or the main number.

Having provided for information for the two default extensions, the operation extension, and the extension for the user activating the account, the user is presented with the opportunity to add additional extensions. FIG. 6E shows an example user interface 650 for adding additional extensions. The user interface can present existing extensions under this account, e.g., the operator extension (0) and the default user extension 101. The user interface can also present a selectable user interface element for adding a new extension. When the user selects that option by, for example, touching the icon for adding extensions on the touch sensitive screen, a user interface for adding extensions is presented.

FIG. 6F shows an example user interface 660 for setting up an additional extension 102. In some implementations, the option presented in this interface is the same as that for setting up extension 101. The name and contact information of the extension user can be added from an address book, or manually by the user setting up the account. Similar to interfaces for setting up other extensions, interfaces for adding a new extension can also present additional interfaces for selecting forwarding rules, and voicemail greetings, etc. Alternatively, once the name and contact information has been entered, the current user can exit the "add extension" interface and proceed to activate the account. Once the account is activated, the telecommunications services server will contact the users for the additional extensions to set up the forwarding rules, voicemail greetings etc. for their individual extensions.

FIG. 6G shows an interface 670 for deleting an extension prior to account activation. If a user has created an additional extension, but changes his mind prior to activation, he can press on the icon for the additional account in the account setup interface shown in FIG. 6E, which leads to the interface 670.

Once a user has finished setting up all the extensions for the main number, he can return to the user interface 650 shown on FIG. 6E. Interface 650 can be presented as the final interface before the activation for the multiple-extension account. A button on the interface 650 (e.g., the "Done" button) can be clicked, and with the single click, all the information previously entered in prior steps are sent to the virtual PBX server, and the account will be activated accordingly. Once the account is activated, the user can proceed to use the various functionalities provided by the virtual PBX services provider for this account.

Optionally, once the user clicks on the activation button ("Done" button in FIG. 6E), a setup summary can be presented. FIG. 6H shows an example setup summary interface 680. The setup summary can show, for example, whether the activation was successful, the main number for the telecommunications services activated, the extension name for the user who activated the account, status of the forwarding rules for this extension, additional extensions that have been set up under this main number, the status of the auto-receptionist, and the status of a dial-by name directory service. The summary can also optionally state that short message services (SMS) notifications will be sent to users assigned to additional extensions so that they can set up their own forwarding rules and voicemail greetings for their respective extensions.

Figures 7A, 7B, 7C:
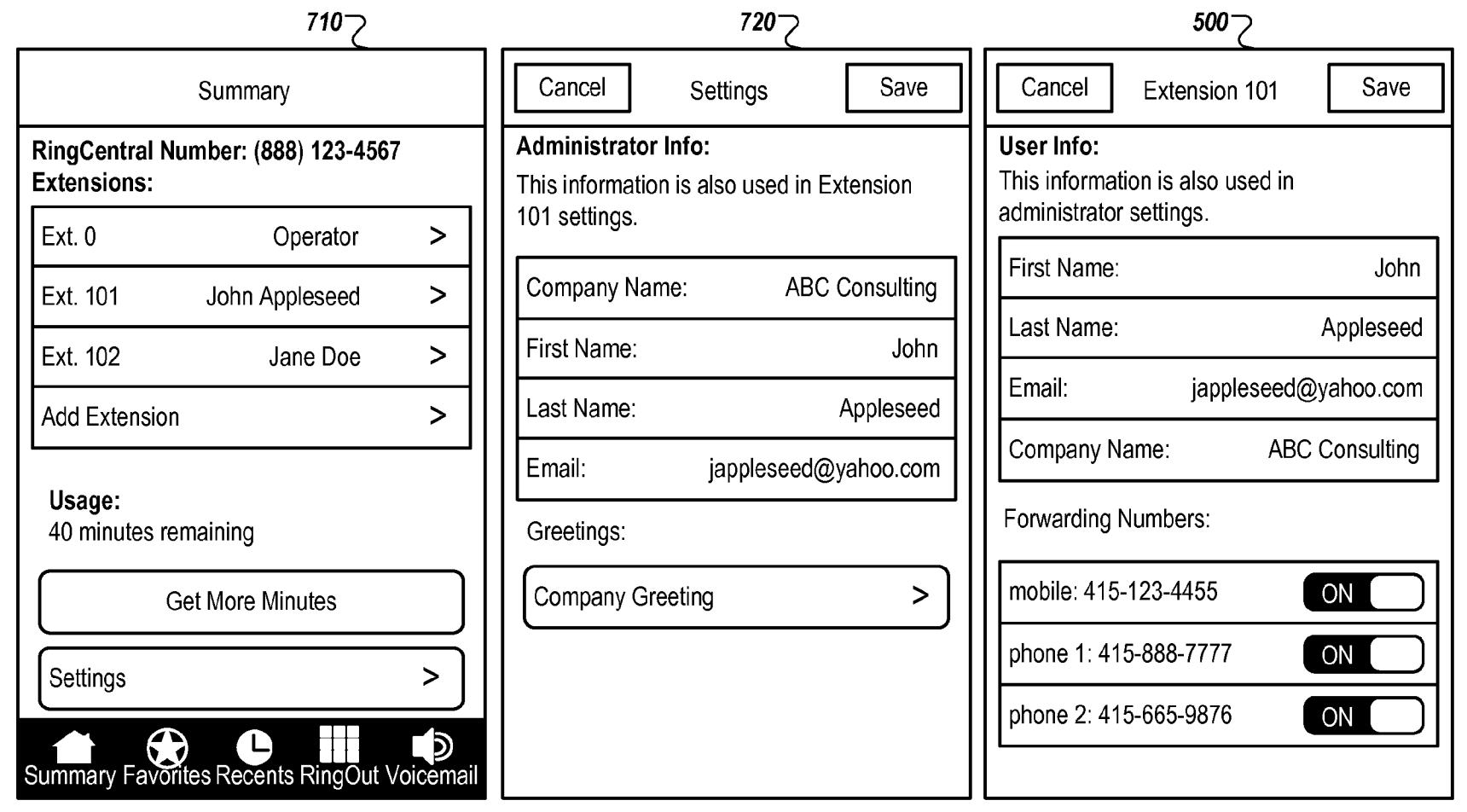

FIG. 7A shows an example interface 710 for a summary of an activated multi-extension account. Similar to the "Home" interface 430 for the single-line account shown in FIG. 4D, in user interface 710, the account main number, available extensions, available minutes for service can be presented. In some implementations, other user elements for adding additional extensions or adding more service minutes can be presented. The user interface 710 can also include a settings button which a user can select to invoke a next user interface showing the current settings for the user.

FIG. 7B shows the settings interface 720 for the current user. The settings interface 720 provides a summary of administrator information, company name, administrator name and contact information, and company greetings. All of which can be selected and edited.

From the summary interface 710, a user can also invoke detailed information for each of the extensions, such as extension 101, the operation extension (0), and any additional extensions such as extension 102, by selecting the icon for that particular extension. For example, FIGS. 7C and 7D show the detailed information for extension 101. The information can include the user's name, contact information, company name, forwarding numbers, and current status of the forwarding numbers, introductory greeting, and voicemail greeting. All of these items can be selected and edited. FIG. 7E shows the detailed information for the additional extension 102. All the detailed information can be selected and edited, and there is also an option to delete this extension. FIG. 7F shows the detailed information for the operator extension. The same setup options are available as in the initial setup interface in FIGS. 6A-6C.

Alternative to setting up all the additional extensions during the account activation stage, the user has the option to only specify the name and contact information of the additional extensions, and have the extension users set up their own extensions individually on their own. Once an account is activated, the virtual PBX server can send out communications such as emails or SMS messages to the users of the additional extensions as specified during account activation. An example message can state: "Welcome to RingCentral! Your phone number is <the main number selected for the account> Extension < . . . >. To access your account and complete the setup, please download RingCentral app from iTunes store and login to your account using password < . . . >."

Figure 8:
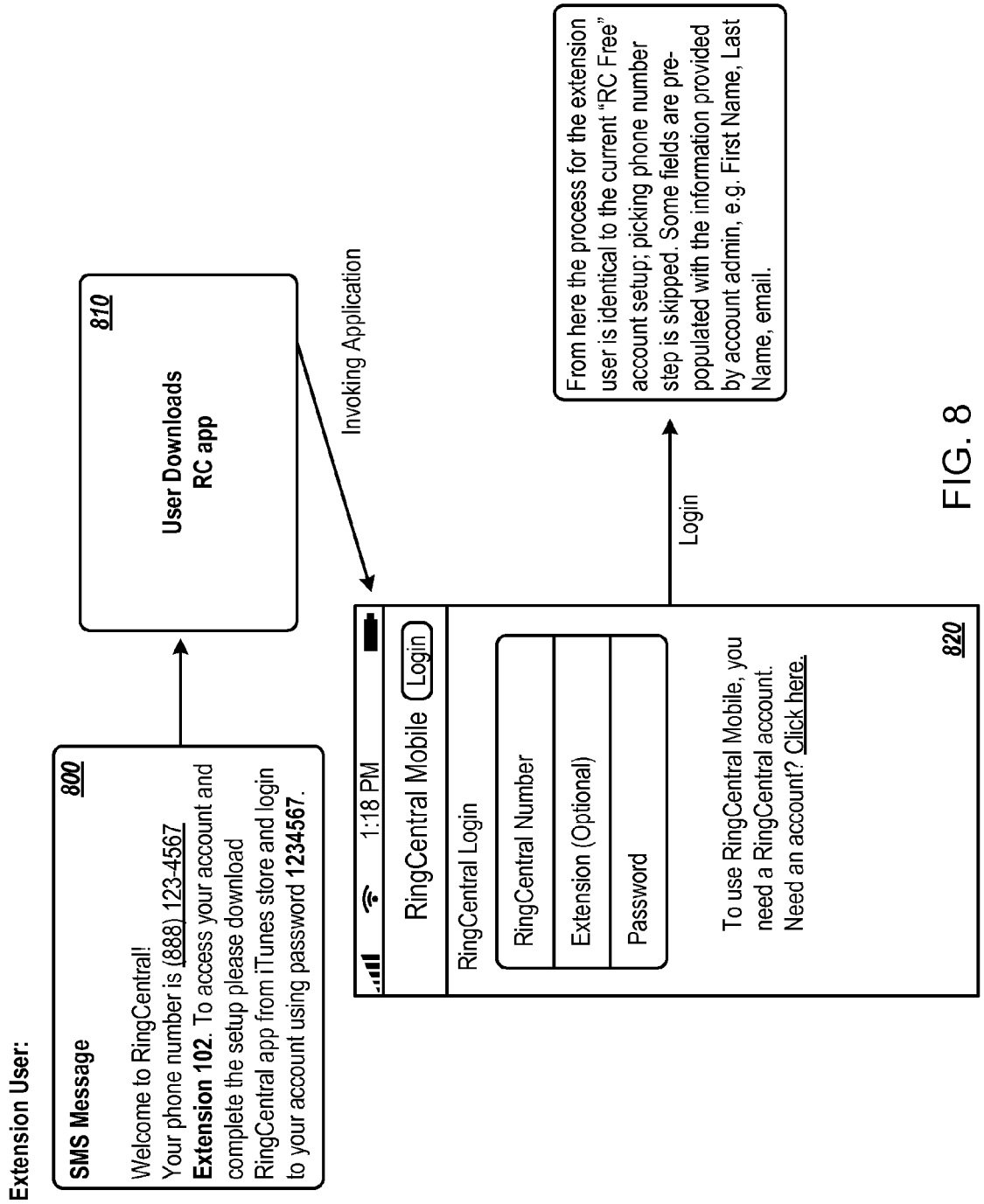
FIG. 8 shows an example process for notifying extension users to setup their individual extensions.

FIG. 8 shows an example process for extension setup by individual extension users. Once the extension user receives the notification 800 and downloads the virtual PBX services application specified and invokes the application (810), a user interface 820 for logging into the service is presented. The interface 820 presents an option for entering an extension setup interface. By selecting the "Extension" button on the initial user interface 820 and logging in using the password, and the identifier (e.g., the main number) supplied in the notification email or SMS message, the extension user can proceed to set up his/her own extension. The steps for setting up the extension can be identical to setting up a free/or evaluation account as described earlier. The main number selection step is skipped because the extension already has a main number chosen by the administrator. Some of the fields are automatically populated by the information supplied by the administrator during the initial activation, for example, the extension user's name, contact information, etc. The extension user can proceed to set up the forwarding rules, introductory greetings, and voicemail greetings as described earlier for other extensions.

Once all the extension users have completed their individual setup process, a multi-extension telecommunications service is fully configured according to individual rules. An outside caller can call the main number, and choose an extension, and the call will be routed and responded to according to the rules set up for that particular extension. In addition, each extension user can utilize the RingOut functionality and have the call appear as if it has originated a single unified number (the main number). In some implementations, however, it is possible to set up the individual extensions such that other phone numbers specified by the extension users are displayed as the caller ID for the RingOut calls.

Any of the functionalities or options available to one type of account can be made available to another type of account. Functionalities mentioned in one context and not in another do not serve to limit the applicability of those functionalities in the other contexts.

Figure 9A:
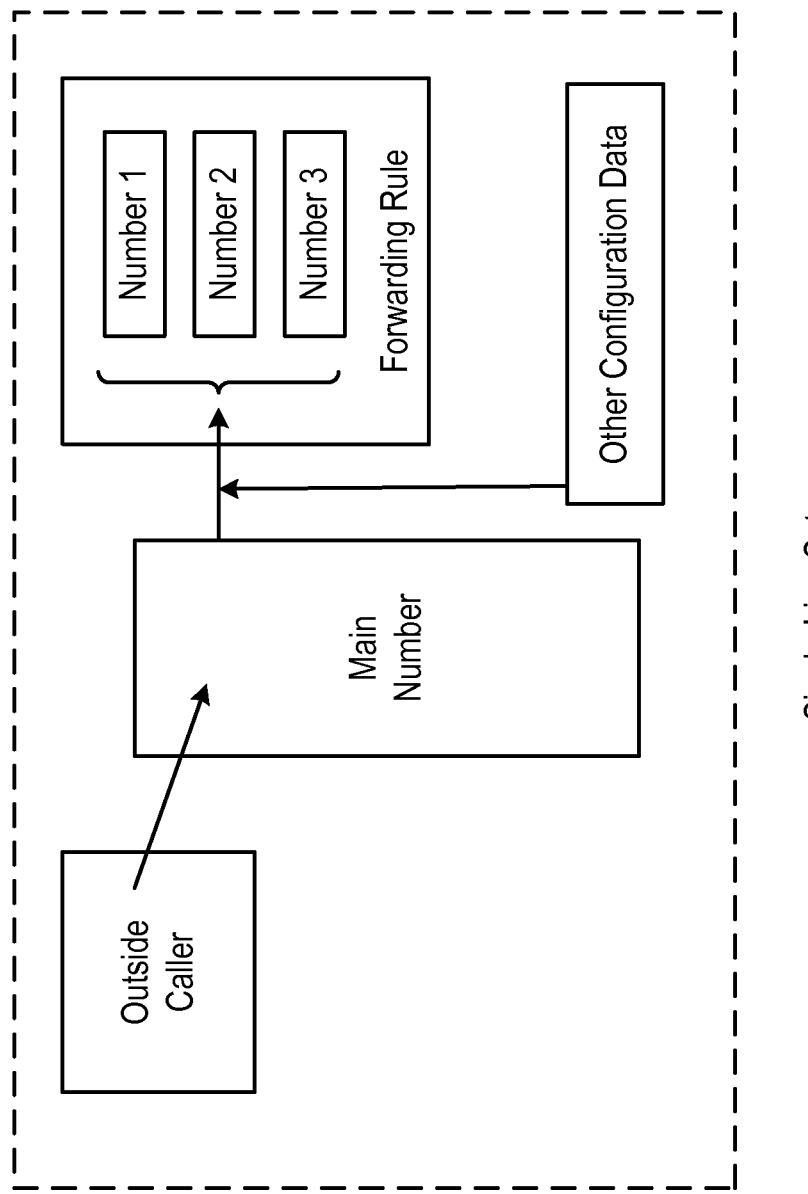
FIGS. 9A-9B show example setup configurations for a single-line and a multi-extension virtual PBX service account.
Figure 9B:
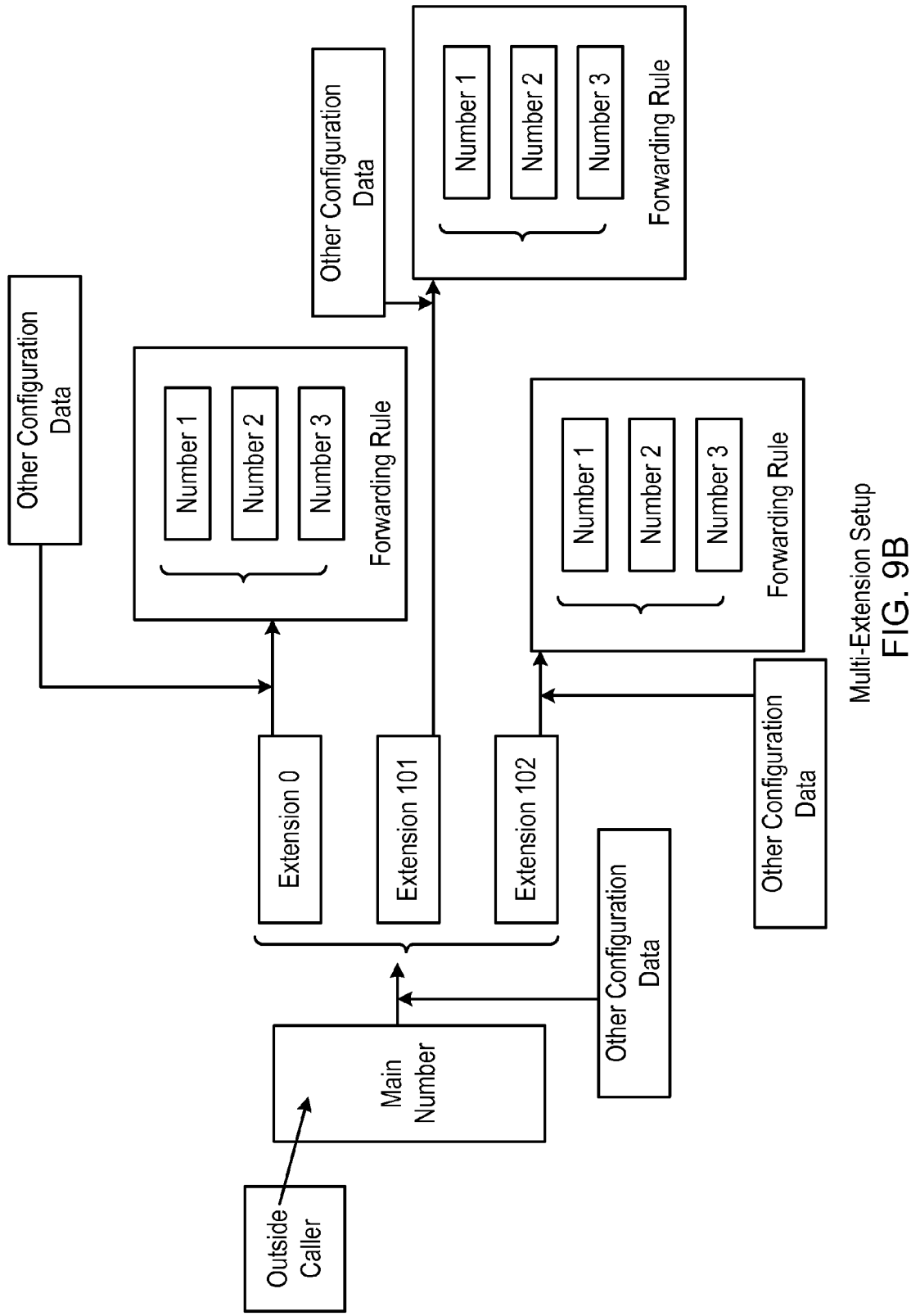

FIG. 9A illustrates the setup configurations of a single-line virtual PBX service and FIG. 9B illustrates a multi-extension virtual PBX service. In a single-line setup and activation, the user can set up a main service telephone number ("main number") that identifies the user to the outside callers and at the TSP server end. The services activated can include a subset of pre-provisioned and pre-configured virtual PBX services, optionally customized by the information provided during the activation by the user. For example, the pre-provisioned service can include call forwarding to the contact number provided by the user or to multiple numbers according to call forwarding rules set by the user during activation. In the multi-extension virtual PBX services setup, several users can share a main number, and an outside caller is able to choose which branch or extension to call by identifying the branch or extension name. Users of each extension each have their own set of pre-provisioned and pre-configured telecommunications services, optionally customized by themselves or by the user activating the service account.

Client Side Application for Activating Telecommunications Services

A subset of virtual PBX services can be activated by a single submission of activation data by the user. The virtual PBX services application can be implemented for a mobile device. When a user runs the virtual PBX services application, the application generates a user interface for user to login as an existing user, or an extension user, or to setup a new account. If a user logs in as an existing user or an extension user, the application communicates with the telecommunications server (TSP) with the request to login and the login information; the application then receives information pertaining to the account corresponding to the login information from the server, and presents an interface containing information previously submitted by the user and other information pre-set by the server. The user or extension user can proceed to modify the information (such as through edit) or use the services (such as to RingOut) available to this account. During the activation process, the application stores the user inputs until the user is ready to submit the information, once the user selects to activate the service by clicking on a "submit" or "finalize" button, the application will send the information to the server in a single submission to update the account information or send the request for services to the server. The application can communicate with the server during services such as a RingOut according to the normal client-server processes applicable to other forms of communication means (e.g., a web version of a call controller).

If a user selects the option to create a new account, the application will send a request to the server to create a new account, and receive information from the server such as a set of available main numbers. Once the application receives information from the server, it will present a user interface with the set of available main numbers for selection, and fields for the user to input other requisite information for account activation. Alternatively, the application can present to the user a message stating that there is no available number at this time, and asks the user to try later. If there are available main numbers at the server side, and the application presents a selection of available numbers to the user, the user can then select a main number, enter all requisite information or have the application automatically populate all requisite fields for account setup and activation. Once the user completes all requisite information, and clicks on an activation button, the application will send all the information necessary for account activation to the server. The application can then optionally wait for the server to respond with a successful activation confirmation, or exits until reinvoked with the correct login information that the user receives for this account from other routes (e.g., an email confirmation, a callback confirmation, etc.). In the scenario for multi-extension activation, the application will send the request for activation to the server, and the server will notify the extension users to login and setup their individual call control rules. The user activating the account can proceed to use the telecommunications services immediately after the activation, and does not have to wait for all extensions to be completely set up.

The interaction between the mobile device application and the virtual PBX server is described further in patent application Ser. No. 12/154,457, titled "Telecommunications Services Activation," filed on May 30, 2008, the entirety of which is hereby incorporated by reference.

An Example Mobile Device

Figure 10:
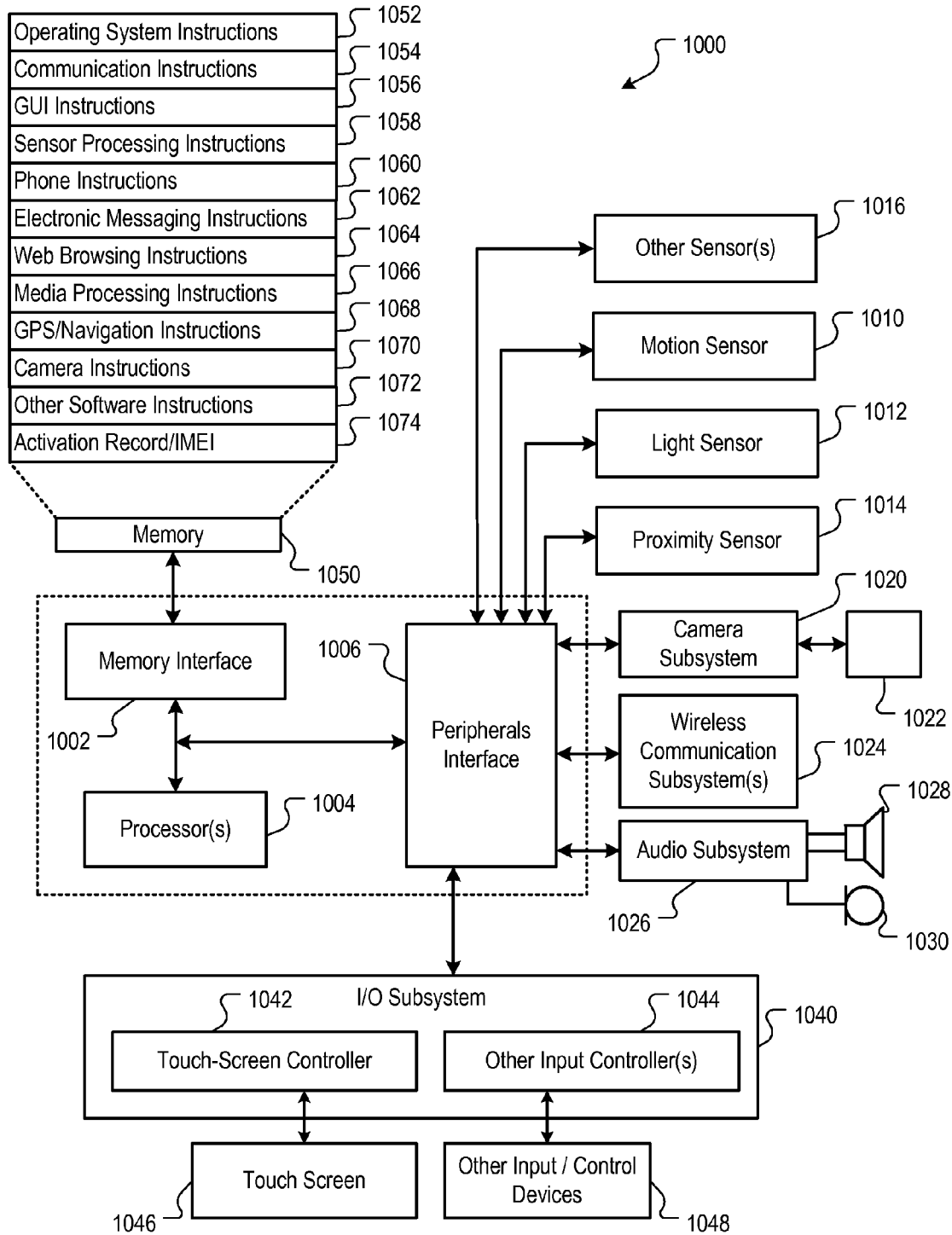
FIG. 10 shows example system architecture for a mobile device.

FIG. 10 is a block diagram 1000 of an example implementation of a mobile device. The mobile device can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the mobile device can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the orientation, lighting, and proximity functions. Other sensors 1016 can also be connected to the peripherals interface 1006, such as a positioning system (e.g., GPS receiver), a temperature sensor, a biometric sensor, or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the mobile device is intended to operate. For example, a mobile device can include communication subsystems 1024 designed to operate over a GSM network, a GPRS network, an EDGE network, a Wi-Fi or WiMax network, and a Bluetooth™ network. In particular, the wireless communication subsystems 1024 may include hosting protocols such that the mobile device may be configured as a base station for other wireless devices.

An audio subsystem 1026 can be coupled to a speaker 1028 and a microphone 1030 to facilitate voice-enabled functions, such as voice recognition, voice replication, digital recording, and telephony functions.

The I/O subsystem 1040 can include a touch screen controller 1042 and/or other input controller(s) 1044. The touch-screen controller 1042 can be coupled to a touch screen 1046. The touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration may disengage a lock of the touch screen 1046; and a pressing of the button for a second duration that is longer than the first duration may turn power to the mobile device on or off. The user may be able to customize a functionality of one or more of the buttons. The touch screen 1046 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks. The operating system 1052 may include instructions for handling basic system services and for performing hardware dependent tasks. In some implementations, the operating system 1052 can be a kernel (e.g., UNIX kernel).

The memory 1050 may also store communication instructions 1054 to facilitate communicating with one or more additional devices, one or more computers and/or one or more servers. The memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; and/or other software instructions 1072 to facilitate other processes and functions, e.g., various functions of the virtual PBX services application. The memory 1050 may also store other software instructions (not shown), such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) 1074 or similar hardware identifier can also be stored in memory 1050.

Server Side for Activating Telecommunications Services

Figure 11:
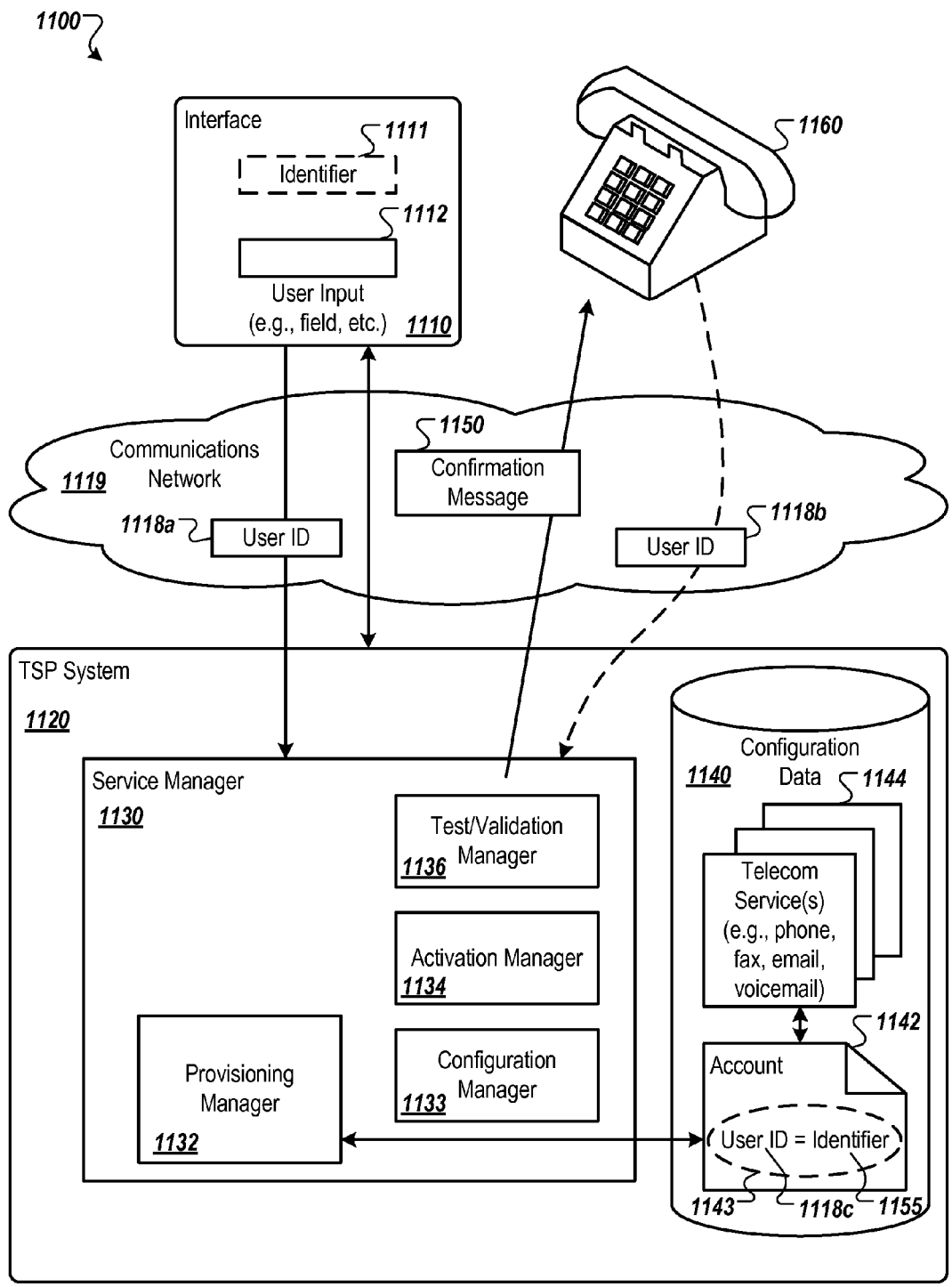
FIG. 11 shows an example telecommunications service provider (TSP).

FIG. 11 illustrates an example virtual PBX service provider system 1100. A telecommunications services provider ("TSP") system 1120 can include a service manager 1130 and a repository 1140. Service manager 1130 can be configured to receive data representing a request to activate a subset of virtual PBX services. The data can include user identification information, such as user ID 1118a or user ID 1118b, either of which can be sufficient to activate the virtual PBX services. TSP system 1120 can be configured to receive user IDs 1118a and 1118b via a communications network 1119 from an interface 1110 on a mobile device. The mobile device communicates with the server and submits the information entered by a user in the interface 1110. The user ID 1118a can be contact information, name, telephone number, email address, or a main telephone number selected by the user trying to activate the account. Repository 1140 can be configured to store data representing configuration data 1144 for configuring the virtual PBX services. In some implementations, configuration data 1144 can be pre-configured to provide a discrete set of virtual PBX services that, for example, can be activated by service manager 1130 using user IDs 1118a and 1118b, without requiring other information. Configuration data 1144 can include an identifier 1155 for accessing the virtual PBX services, identifier 1155 being associated with other configuration data 1144 either prior to, or after, TSP system 1120 receives the data representing the request to activate the virtual PBX services.

In at least some implementations, TSP system 1120 can be configured to generate signals for transmission to phone 1160 to confirm successful activation of the telecommunications services. In some implementations, the signal or confirmation message can be sent to a mobile device initiating the activation request. For example, confirmation message 1150 can include signals that cause phone 1160 to ring, among other things, thereby confirming that a call to identifier 1155 can be routed to a communications device associated with user IDs 1118a or 1118b. Thus, identifier 1155 can specify a main telephone number (or main number) for accessing a subset of virtual PBX services. User IDs 1118a and 1118b can represent a telephone number for phone 1160 or a mobile device sending the activation request. In some implementations, the IDs can be a mobile device that is reachable via identifier 1155 as an extension of the virtual PBX service. Note that user IDs 1118a and 1118b can represent the same user identification number, but indicate that the user identification number may have been obtained by different techniques (e.g., by way of interface 1110 or by way of call data). An identifier can be a telephone number (e.g., a toll-free telephone number, such as a main telephone line) for accessing virtual PBX services. An identifier can also be an email address, or any other symbol (or set of symbols) that represents a common contact identifier for a group of contact identifiers, such as a group of extension numbers for a PBX. Prior to activation, an identifier can be associated with a subset of virtual PBX services of TSP system 1120 that are yet to be provisioned and activated. A "user identifier" (e.g., user ID) can refer to a contact identifier (such as the phone number of the phone 1160 or mobile device) that can be associated with an one extension number in a group of extension numbers. A "user identifier" can also be a facsimile number for a fax machine, an email address of an email account, a voice mail address.

In some implementations, TSP system 1120 can generate interface 1110 to present a user input, which can be a field 1112 configured to accept data, such as user identification information (e.g., such as a user identifier, which can be represented as user ID 1118a). Optionally, TSP system 1120 can generate a representation 1111 of an identifier to present in interface 1110. The identifier, in some instances, can be a toll-free number as a main telephone line associated with the subset of virtual PBX services under activation. Interface 1110 can be accessible as a webpage at a particular URL. In some implementations, the interface is generated by an application on a mobile device. The mobile device receives the information such as the main identification number from the TSP system (or the server), and presents the main identification number in the interface presented by the virtual PBX services application running on the mobile device. In some implementations, TSP system 1120 or the virtual PBX services application running on the mobile device can present field 1112 simultaneously (or substantially simultaneously) to the presentation of representation 1111 of the identifier. In some implementations, TSP system 1120 can configure configuration data 1144 (or a portion thereof) prior to presenting either field 1112 or representation 1111 of an identifier or both. As such, little or a negligible amount of information can be sufficient to provision a subset of virtual PBX services, which can be defined by the pre-configured portions of configuration data 1144. Thus, the subset of virtual PBX services can operate as a default set of services, thereby reducing or eliminating the need for a user to perform an initial and/or a complicated configuration of telecommunications services. Further, TSP system 1120 or the virtual PBX services application running on the mobile device can maintain the presentation of interface 1110 during the activation of the subset of virtual PBX services, without transitioning to other interfaces. In view of the foregoing, discrete set of virtual PBX services can be provisioned and activated without transitioning away from interface 1110. In some implementations, this can simplify the procurement of virtual PBX services.

In some implementations, TSP system 1120 can test and validate successful activation of the subset of virtual PBX services, and then can confirm the validation by, for example, generating a call including a confirmation message 1150 to a phone 1160 or the mobile device from which the activation request was sent. If a user identifier is entered into interface 1110, then TSP system 1120 can generate a call to the user identifier number to confirm activation of the subset of virtual PBX services. In some instances, the call includes a confirmation message 1150 to the user identification number or the mobile device sending the activation request, substantially simultaneously to the presentation of either field 1112 or representation 1111 of the identifier in the interface 1110. In some implementations, confirmation message 250 can also include an automated-voice notification that the activation has been complete. Alternatively, the confirmation can be sent to other contact endpoints provided by the mobile device, such as an email address, a fax number, or SMS address, or to the virtual PBX services application running on the mobile device. In some implementations, once the virtual PBX services application receives a confirmation from the server that the service is activated successfully, the application can present a summary page or confirmation to the user in an interface on the mobile device.

In the example shown, services manager 1130 can include one or more of the following: a provisioning manager 1132, an activation manager 1134, and a test/validation manager 1136. Provisioning manager 1132 can operate to configure configuration data 1144 to provide a subset of virtual PBX services in association with, for example, a user account 1142. While user account 1142 can include data representing user identification information (e.g., user IDs 1118a and 1118b), data representing identifier 1155, and data representing an association between the user identification information and data representing identifier 1155. In some implementations, provisioning manager 1132 can operate to configure configuration data 1144 prior to receiving a request to provision a set of default services. In some implementations, provisioning manager 1132 can operate to configure configuration data 1144 after receiving the request.

To provision telecommunications services once a request has been made, provisioning manager 1132 can determine either a user ID 1118c or an identifier 1155, or both, and form an association 1143 with which to activate the virtual PBX services. In some instances, provisioning manager 1132 can determine both user ID 1118c and an identifier 1155, and configure user account 1142 to include them. For example, user ID 1118c can be received as user ID 1118a via interface 1110. In some implementations, identifier 1155 can be selected when a user selects representation 1111 of an identifier from a pool of identifiers. Provisioning manager 1132 can determine the selected identifier and store it in user account 1142, and can remove the selected identifier from the pool of available identifiers so that it can no longer be provisioned. In some implementations, identifier 1155 can be generated without feedback from the user (e.g., as a pre-determined identifier that can be pre-selected or randomly determined), with provisioning manager 1132 storing the pre-determined identifier in user account 1142 as identifier 255. In this case, either ID 1118a or ID 1118b can be sufficient for provisioning, configuring, and activating telecommunications services. Thus, a user need not enter a selection for an identifier or other information.

Activation manager 1134 can be configured to activate user account 1142 once it has been provisioned with configuration data defining a subset of virtual PBX services. Thereafter, identifier 1155 can be used to access the activated subset of virtual PBX services. For example, if identifier 1155 is a telephone number, then the telephone number can be a main line that can provide access to the virtual PBX services. For example, if identifier 1155 is a telephone number, then the telephone number can be a main line that can provide access to the telecommunications services defined by, for example, user account 1142. In some implementations, test/validation manager 1136 can optionally be used to validate successful provisioning and activation of the subset of virtual PBX services. For example, to validate a telephone number provided as user ID 1118a, test/validation manager 1136 can be configured to make a call to the telephone number associated with phone 1160. In other examples, user ID 1118a can be an email address. Thus, test/validation manager 1136 can be used to send an email massage to the email address to validate that the email address can be implemented as an extension.

In some implementations, a single submission of data (e.g., user ID 1118a) to TSP system 1120 can enable a user to acquire an account to use a subset of virtual PBX services. There is not need for the user to provide other data (e.g., contracting, billing, configuration, or other information) to activate the subset of virtual PBX services. Once user account 1142 is activated, the telecommunications services can be used. That is, a user can start using the primary identification number (e.g., a toll-free telephone number) associated with a subset virtual PBX services as a common contact identifier 1155 (or address) nearly instantaneously, so that third parties can immediately access the associated virtual PBX services (e.g., the user's customers can contact the user at an extension reachable via identifier 1155). For example, if the subset of virtual PBX services includes a call-forwarding service, a call made to the toll-free telephone number (i.e., identifier 1155) can be forwarded to a telephone number, such as user ID 1118a.

Examples of interface 1110 can include physical interfaces (e.g., a display on a mobile device) and virtual interfaces (e.g., a web page, panel, window, display, palette, tab, screen, or the like in an application program running on the mobile device). In some implementations, a user can provide additional data in a single submission to request activation of telecommunications services. Further, TSP system 220 can include one or more servers, software applications, application programmable interfaces (APIs), logic (e.g., software or electrical/hardware logic), or any combination thereof. For example, service manager 1130 can include provisioning manager 1132, an activation manager 1134, a test/validation manager 1136, and other components, such as a configuration manager (not shown), any of which can be implemented in hardware, software, or any combination thereof.

In some implementations, a subset of telecommunications services can be associated with configuration data that represents any combination of virtual PBX services, such as call forwarding, call routing, facsimile, email, text messaging, voice messaging (i.e., voice mail), extensions, private branch exchange, and the like. A default configuration for a subset of virtual PBX services can be stored in repository 1140 as, for example, configuration data 1144.

The term "single submission," such as single submission of data, can refer to sending, providing, or transmitting sufficient data to activate or request telecommunications services from an interface without requiring an interface transition to provide additional data to request the same telecommunications services. An example single submission of data can be clicking a button on a graphical user interface (e.g., "submit", "send", or "activate" buttons, or the like) on a mobile device.

In some implementations, "provisioning" refers to providing capabilities for telecommunications services (e.g., virtual PBX services) to a user or customer account, including transmission of voice, data, or both to a telephone number, facsimile number, email address, voicemail address, the like, or any combination thereof. This involves providing for the hardware, software, storage, processing power, administrative requirements etc necessary for supporting the services for this account which can be a placeholder account not currently activated or associated with a particular user.

In some implementations, "configuring" refer to modifying data for a user account to configure one or more virtual PBX services. As used herein, the term "activating," can refer to enabling a user account and its data (e.g., configuration data) to provide a subset of virtual PBX services. In some embodiments, the above described system, components, elements, and processes can be varied in number, structure, function, configuration, implementation, or other aspects and are not limited to those shown and described.

To illustrate the operation of TSP system 1120, consider the following example. A request for activation can be handled by provisioning manager 1132, for example, by creating and storing a user account 1142 in database 1140. User account 1142 can include a binding of a CTN (e.g., 1-650-555-9876) to a TSI (e.g., 1-888-555-1200), which in turn can be associated via an association 1143 with a set of telecommunications (virtual PBX) services being defined by configuration data 1144. Configuration data 1144 for a subset of virtual PBX services can include different types of services (e.g., call extensions, facsimile, email, voicemail, and the like), and number of services in each type (e.g., four call extensions, an email box, and a facsimile), any combination of services types, and/or one or more rules to, for example, govern how services are rendered (e.g., for extension 1, if a call is not answered by the third ring, send the caller to a voicemail box). A configuration manager 1133 can be used to create services configuration data 1144. In some implementations, configuration data 1144 can be pre-defined (i.e., defined before a user initiates an activation request). Configuration manager 1133 can also be used to add, remove, or change the subset of virtual PBX services after the virtual PBX services have been initially activated. Additional databases can be used to store automatic number identification (ANI) data, calling name (CNAM) data, dialed number identification service (DNIS) data, or any other data or combination thereof. These additional databases can be accessed by provisioning manager 1132, configuration manager 1133, activation manager 1134, or other system components to access or look up additional data associated with a CTN. For example, the name of a caller can be looked up using a telephone number (e.g., a CTN). Other call data (e.g., caller id or ANI data) can be determined using a telephone number (e.g., a CTN).

In some implementations, after a placeholder account is provisioned and configured (e.g., configured in accordance with default configuration data), the placeholder account and the default set of virtual PBX services associated with the placeholder account can be activated. To activate the placeholder account, activation manager 1134 can, for example, mark an "activated" flag or field in the placeholder account, or in configuration data 1144 thereof, to indicate that the placeholder account and its services have been associated with a user and have been activated. In some implementations, activating an account (i.e., associating a placeholder account with a user ID) can be done in real-time or instantaneously, at least as perceived by the user. By pre-provisioning one or more placeholder accounts before a user request for activation is received, the TSP system always have a set of pre-provisioned accounts available. When a user request is received, the association between a pre-provisioned account and the user can be accomplished without hardware and/or personnel delays. The association between the placeholder account and a user ID can be fully automated, and can be accomplished within seconds as opposed to days or weeks as required by conventional provisioning and activation techniques. In some implementations, physical resources necessary for account setup and configuration are pre-provisioned, and an account is configured and activated by associating the different resources with a user ID. Because the major bottlenecks in account setup in conventional techniques have been eliminated before a user request is received. The account activation appears instantaneous to the user making the request.

In some implementations, test/validation manager 1136 can be used to test or validate a CTN or to confirm activation. For example, to test activation, test/validation manager 1136 can interact with communications interface (e.g., a call handler) to call a TSI associated with the CTN, which, in turn can cause TSP system 1100 to generate a call to the CTN after a successful activation. The communication interface can detect whether the TSI is associated with virtual PBX services provided by the TSP system 1120. If so, TSP system 1120 can look up the associated CTN in database 1140, retrieve information relevant to user account 1142, and route the call to the CTN, which is received at telephone 1160 or a mobile device sending the activation request. Caller data, such as caller-ID data, or the TSI can be sent to the telephone 1160 or the mobile device sending the activation request. Alternative design of the telecommunications service provider system is also possible.

A TSP system 1120 can include any number and any combination of the following: web server, databases, media server, call handler, and service manager server. In some implementations, the TSP system can include an additional server for handling requests from a virtual PBX services application running on a mobile device. This additional server can be implemented as part of the web server, or a standalone server.

Figure 12:
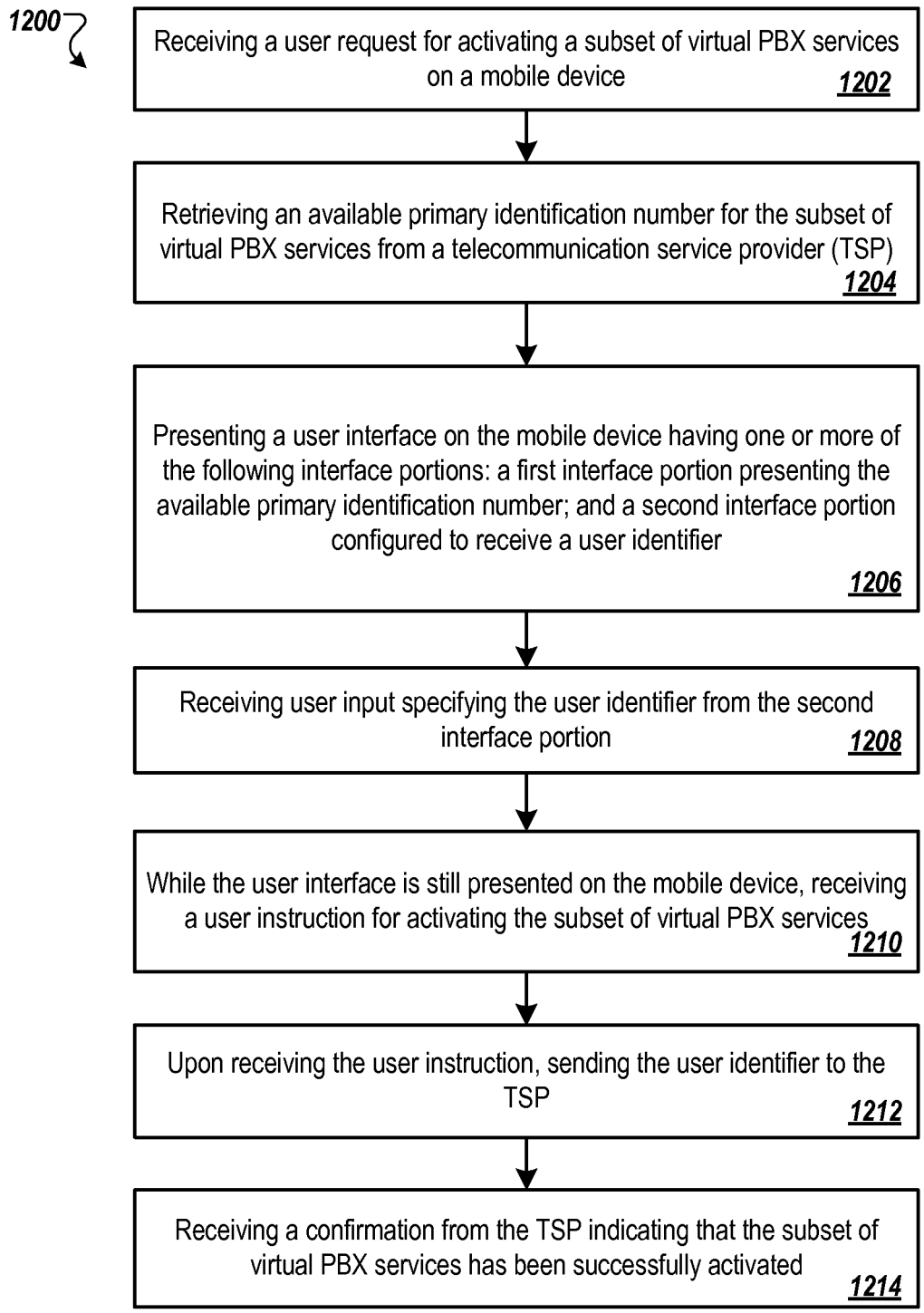
FIG. 12 is a flow diagram of an example process for instant activation of virtual PBX services on a mobile device.

Example Processes for Instant Activation of Virtual PBX Services on a Mobile Device FIG. 12 is a flow diagram of an example process 1200 for instant activation of virtual PBX services on a mobile device.

First, a user request for activating a subset of virtual PBX services is received on a mobile device (1202). An available primary identification number for the subset of virtual PBX services is retrieved from a telecommunication service provider (TSP) (1204). A user interface is presented on the mobile device (1206). The user interface has one or more of the following interface portions: a first interface portion presenting the available primary identification number and a second interface portion configured to receive a user identifier. User input specifying the user identifier is received from the second interface portion (1208). While the user interface is still presented on the mobile device, a user instruction for activating the subset of virtual PBX services is received (1210). Upon receiving the user instruction, the user identifier is sent to the TSP (1212). Then, a confirmation is received from the TSP indicating that the subset of virtual PBX services has been successfully activated (1214).

In some implementations, the user identifier is a telephone number, the set of telecommunication services includes an operator extension, and the telephone number is mapped to the operator extension. In some implementations, the confirmation is a call to the telephone number. In some implementations, the user identifier is an email address, the subset of virtual PBX services includes an operator extension, and the user interface has a third interface portion configured to receive a telephone number for the operator extension. In some implementations, the confirmation is an email to the email address. In some implementations, the user interface further includes a third portion configured to receive one or more configuration parameters for the subset of virtual PBX services. The one or more configuration parameters specify additional extensions for the subset of virtual PBX services, an auto-receptionist greeting, voice mail rules, or call forwarding rules for the subset of virtual PBX services. In some implementations, a list of available primary identification numbers is retrieved and presented in the first interface portion, and the user input selects a primary identification number from the list of available primary identification numbers.

Figure 13:
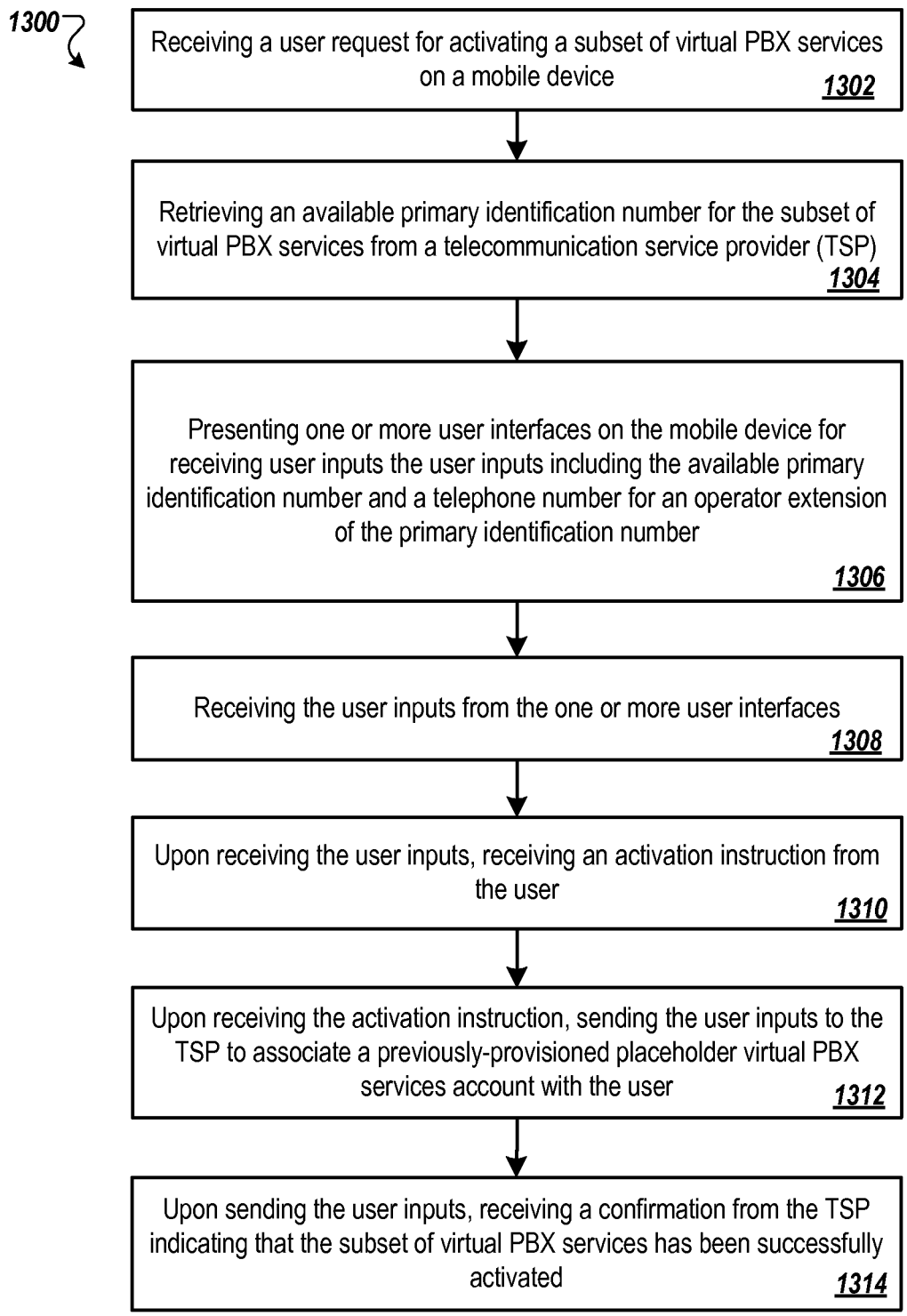
FIG. 13 is a flow diagram of another example process for instant activation of virtual PBX services on a mobile device.

FIG. 13 is a flow diagram of an example process 1300 for instant activation of virtual PBX services on a mobile device. A user request for activating a subset of virtual PBX services is first received on a mobile device (1302). An available primary identification number for the subset of virtual PBX services is retrieved from a telecommunication service provider (TSP) (1304). One or more user interfaces are presented on the mobile device for receiving user inputs (1306). The user inputs include the available primary identification number and a telephone number for an operator extension of the primary identification number. The user inputs are received from the one or more user interfaces (1308). Upon receipt of the user inputs, an activation instruction is received from the user (1310). Upon receipt of the activation instruction, the user inputs are sent to the TSP to associate a previously-provisioned placeholder virtual PBX services account with the user (1312). After the user inputs are sent, a confirmation is received from the TSP indicating that the subset of virtual PBX services has been successfully activated (1314).

In some implementations, the user inputs further include configuration parameters for the subset of virtual PBX services, and the configuration parameters specifies additional extensions for the subset of virtual PBX services, an auto-receptionist greeting, voice mail rules, or call forwarding rules for the subset of virtual PBX services. In some implementations, the user inputs include configuration parameters for the subset of virtual PBX services, and the configuration parameters specify at least one additional extension for the subset of virtual PBX services, and voice mail rules or call forwarding rules for the operator extension and the additional extension. In some implementations, the user inputs include configuration parameters for the subset of virtual PBX services, and the configuration parameters specify at least one additional extension for the subset of virtual PBX services, and an extension identifier for the at least one additional extension. In some implementations, the extension identifier is a telephone number for the additional extension. In some implementations, the extension identifier is an email address for notifying the owner of the additional extension about the successful activation of the virtual PBX services and the additional extension.

Figure 14:
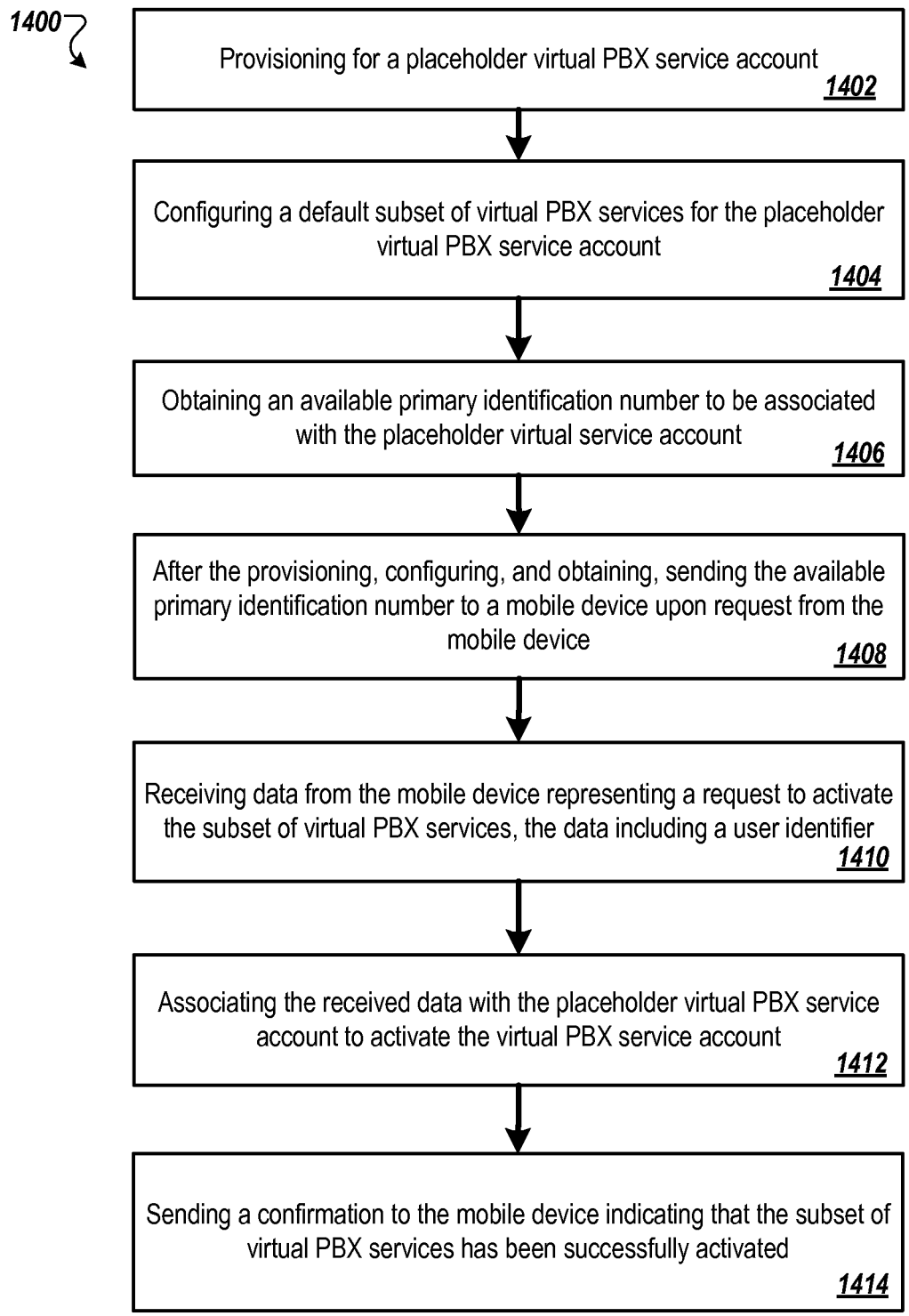
FIG. 14 is a flow diagram of an example process for instant activation of a subset of virtual PBX services on a mobile device.

FIG. 14 is a flow diagram of an example process 1400 for instant activation of a subset of virtual PBX services on a mobile device. First, a placeholder virtual PBX service account is provisioned (1402). A default subset of virtual PBX services is configured for the placeholder virtual PBX service account (1404). An available primary identification number to be associated with the placeholder virtual service account is obtained (1406). After the provisioning, configuring, and obtaining, the available primary identification number is sent to a mobile device upon request from the mobile device (1408). Data is received from the mobile device representing a request to activate the subset of virtual PBX services (1410). The data include a user identifier. The received data are associated with the placeholder virtual PBX service account to activate the virtual PBX service account (1412). A confirmation is sent to the mobile device indicating that the subset of virtual PBX services has been successfully activated (1414).

In some implementations, the user identifier is a telephone number for an operator extension of the subset of virtual PBX services. In some implementations, the data further includes configuration parameters for the subset of virtual PBX services and the configuration parameters specify additional extensions for the subset of virtual PBX services, an auto-receptionist greeting, voice mail rules, or call forwarding rules for the subset of virtual PBX services. In some implementations, the data further includes configuration parameters for the subset of virtual PBX services, and the configuration parameters specify at least one additional extension for the subset of virtual PBX services, and voice mail rules or call forwarding rules for the operator extension and the additional extension. In some implementations, the data further includes configuration parameters for the subset of virtual PBX services, and the configuration parameters specify at least one additional extension for the subset of virtual PBX services, and an extension identifier for the at least one additional extension, where the extension identifier is either a telephone number or an email address. In some implementations, owner of the additional extension is notified about the activation of the virtual PBX service account and the additional extension using the extension identifier. In some implementations, configuration data is received for the additional extension from a second mobile device.

Computer Devices

Figure 15:
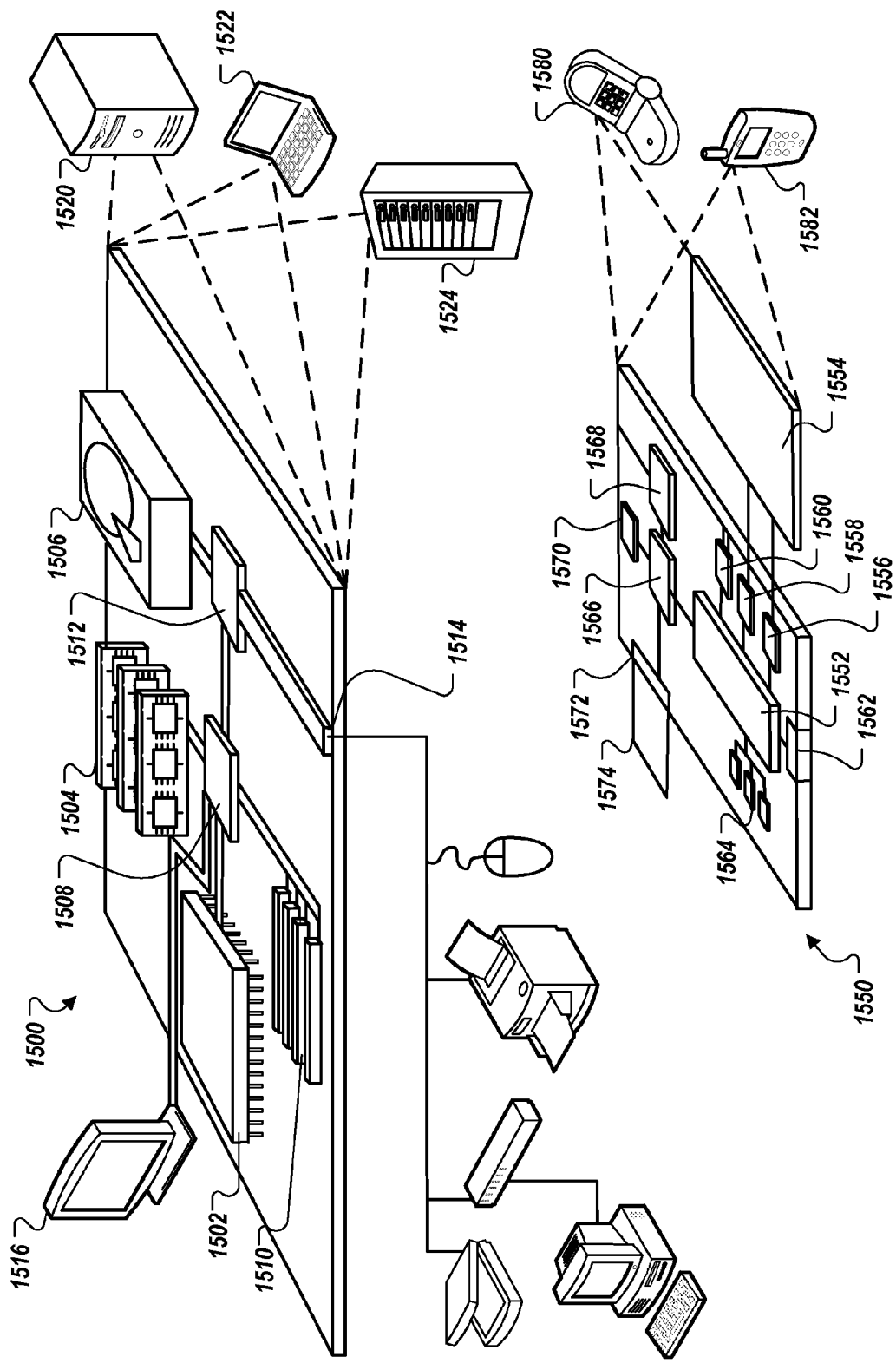
FIG. 15 is a block diagram of example computing devices that may be used to implement the systems and methods described in this document.

FIG. 15 is a block diagram of computing devices 1500, 1550 that may be used to implement the systems and methods described in this document, as either a client or as a server or plurality of client and servers. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a computer-readable medium. In one implementation, the memory 1504 is a volatile memory unit or units. In another implementation, the memory 1504 is a non-volatile memory unit or units.

The storage device 1506 is capable of providing mass storage for the computing device 1500. In one implementation, the storage device 1506 is a computer-readable medium. In various different implementations, the storage device 1506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of duties is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1106 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can process instructions for execution within the computing device 1550, including instructions stored in the memory 1564. The processor may also include separate analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD display or an OLED display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provide in communication with processor 1552, so as to enable near area communication of device 1550 with other devices. External interface 1562 may provide, for example, for wired communication (e.g., via a docking procedure) or for wireless communication (e.g., via Bluetooth or other such technologies).

The memory 1564 stores information within the computing device 1550. In one implementation, the memory 1564 is a computer-readable medium. In one implementation, the memory 1564 is a volatile memory unit or units. In another implementation, the memory 1564 is a non-volatile memory unit or units. Expansion memory 1574 may also be provided and connected to device 1550 through expansion interface 1572, which may include, for example, a SIMM card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provide as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, WiFi, or other such transceiver (not shown). In addition, GPS receiver module 1270 may provide additional wireless data to device 1550, which may be used as appropriate by applications running on device 1550.

Device 1550 may also communication audibly using audio codec 1560, which may receive spoken information from a user and convert it to usable digital information. Audio codex 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smartphone 1582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A method comprising:
   receiving a request for activating a subset of virtual private branch exchange (PBX) services with a telecommunication service provider (TSP) on a mobile device;
   receiving a user identifier;
   retrieving a plurality of primary identification numbers for the subset of virtual PBX services from the TSP;
   receiving a selection of a first primary identification number from the plurality of primary identification numbers;

receiving a selection for activating the subset of virtual PBX services;

responsive to receiving the selection for activating the subset of virtual PBX services, sending an activation request to the TSP including sending the user identifier to the TSP; and receiving a confirmation from the TSP indicating that the subset of virtual PBX services has been successfully activated on the mobile device.

2. The method of claim 1, further comprising:

presenting a user interface on the mobile device, wherein the user interface is configured to receive a first input specifying the user identifier; and wherein receiving the user identifier comprises receiving the first input through the presented user interface.

3. The method of claim 2, wherein receiving the selection for activating the subset of virtual PBX services comprises receiving the selection for activating the subset of virtual PBX services while the user interface is still presented on the mobile device.

4. The method of claim 2, wherein the user interface comprises a first portion for presenting the first available primary identification number and a second portion configured to receive the first input identifying the user identifier.

5. The method of claim 4, wherein the first portion presents each of the available primary identification numbers, and the method further comprises receiving a third input selecting the first primary identification number from the presented available primary identification numbers through the user interface.

6. The method of claim 4, wherein the user identifier is an email address, wherein the subset of virtual PBX services includes an operator extension, and wherein the user interface includes a third interface portion configured to receive a telephone number for the operator extension.

7. The method of claim 6, wherein receiving the confirmation comprises receiving a confirmation email to the email address.

8. The method of claim 1, wherein the user identifier is a telephone number, the subset of virtual PBX services includes an operator extension, and the telephone number is mapped to the operator extension.

9. The method of claim 8, wherein receiving the confirmation comprises receiving a call to the telephone number.

10. A non-transitory computer storage medium encoded with a computer program, the computer program comprising instructions that when executed by one or more computers cause the one or more computers to perform operations comprising:

receiving a request for activating a subset of virtual private branch exchange (PBX) services with a telecommunication service provider (TSP) on a mobile device;

receiving a user identifier;

retrieving a plurality of primary identification numbers for the subset of virtual PBX services from the TSP;

receiving a selection of a first primary identification number from the plurality of primary identification numbers;

receiving a selection for activating the subset of virtual PBX services;

responsive to receiving the selection for activating the subset of virtual PBX services, sending an activation request to the TSP including sending the user identifier to the TSP; and receiving a confirmation from the TSP indicating that the subset of virtual PBX services has been successfully activated on the mobile device.

11. The computer storage medium of claim 10, the operations further comprising:

presenting a user interface on the mobile device, wherein the user interface is configured to receive a first input specifying the user identifier; and wherein receiving the user identifier comprises receiving the first input through the presented user interface.

12. The computer storage medium of claim 11, wherein receiving the selection for activating the subset of virtual PBX services comprises receiving the selection for activating the subset of virtual PBX services while the user interface is still presented on the mobile device.

13. The computer storage medium of claim 11, wherein the user interface comprises a first portion for presenting the first available primary identification number and a second portion configured to receive the first input identifying the user identifier.

14. The computer storage medium of claim 13, wherein the first portion presents each of the available primary identification numbers, and the method further comprises receiving a third input selecting the first primary identification number from the presented available primary identification numbers through the user interface.

15. The computer storage medium of claim 13, wherein the user identifier is an email address, wherein the subset of virtual PBX services includes an operator extension, and wherein the user interface includes a third interface portion configured to receive a telephone number for the operator extension.

16. The computer storage medium of claim 10, wherein the user identifier is a telephone number, the subset of virtual PBX services includes an operator extension, and the telephone number is mapped to the operator extension.

17. A system comprising one or more processors and one or more storage devices storing instructions that when executed by the one or more processors cause the one or more processors to perform operations comprising:

receiving a request for activating a subset of virtual private branch exchange (PBX) services with a telecommunication service provider (TSP) on a mobile device;

receiving a user identifier;

retrieving a plurality of primary identification numbers for the subset of virtual PBX services from the TSP;

receiving a selection of a first primary identification number from the plurality of primary identification numbers;

receiving a selection for activating the subset of virtual PBX services;

responsive to receiving the selection for activating the subset of virtual PBX services, sending an activation request to the TSP including sending the user identifier to the TSP; and receiving a confirmation from the TSP indicating that the subset of virtual PBX services has been successfully activated on the mobile device.

18. The system of claim 17, the operations further comprising:

presenting a user interface on the mobile device, wherein the user interface is configured to receive a first input specifying the user identifier; and wherein receiving the user identifier comprises receiving the first input through the presented user interface.

\* \* \* \* \*